(12) United States Patent
Kim et al.

(10) Patent No.: US 10,950,191 B2
(45) Date of Patent: Mar. 16, 2021

(54) DISPLAY DEVICE

(71) Applicant: Samsung Display Co., Ltd., Yongin-Si (KR)

(72) Inventors: Kwi Hyun Kim, Seongnam-si (KR); Kook Hyun Choi, Asan-si (KR); Woo Gun Kang, Incheon (KR); Kyung Won Park, Seoul (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/553,079

(22) Filed: Aug. 27, 2019

(65) Prior Publication Data

US 2020/0251030 A1    Aug. 6, 2020

(30) Foreign Application Priority Data

Feb. 1, 2019 (KR) ................. 10-2019-0013737

(51) Int. Cl.
*G09G 3/36* (2006.01)
*G09G 3/00* (2006.01)
(Continued)

(52) U.S. Cl.
CPC ........... *G09G 3/3614* (2013.01); *G02F 1/133* (2013.01); *G09G 3/006* (2013.01); *G09G 3/3648* (2013.01);
(Continued)

(58) Field of Classification Search
CPC .... G09G 3/006; G09G 3/3688; G09G 3/3648; G09G 3/3655; G09G 2330/12; G09G 2320/0209; G09G 2320/0219; G02F 1/133; G02F 1/1343; G02F 1/1362; G02F 1/136286; G02F 1/136213; G02F 2201/123
See application file for complete search history.

(56) References Cited

U.S. PATENT DOCUMENTS

2004/0080679 A1* 4/2004 Song ................. G02F 1/136227
349/43
2007/0024560 A1* 2/2007 Kim ..................... G09G 3/3655
345/94

(Continued)

FOREIGN PATENT DOCUMENTS

KR   10-2001-0016862 A   3/2001
KR       10-0516053 B1   12/2005
(Continued)

*Primary Examiner* — David Tung
(74) *Attorney, Agent, or Firm* — Innovation Counsel LLP

(57) ABSTRACT

A display device includes the following elements: a pixel electrode; a first data line electrically connected to the pixel electrode; a second data line adjacent to the pixel electrode without being electrically connected to the pixel electrode; a first sensing electrode disposed directly on the same insulating layer as the pixel electrode; a second sensing electrode disposed directly on the same insulating layer as the first sensing electrode and separated from the first sensing electrode by a predetermined distance; and a third sensing electrode disposed directly on the same insulating layer as the first data line and the second data line, partially overlapping the first sensing electrode to form a first sensing capacitor, and partially overlapping the second sensing electrode to form a second sensing capacitor.

10 Claims, 18 Drawing Sheets

(51) Int. Cl.
*G02F 1/133* (2006.01)
*G02F 1/1362* (2006.01)
*G02F 1/136* (2006.01)

(52) U.S. Cl.
CPC ......... *G09G 3/3655* (2013.01); *G09G 3/3688* (2013.01); *G02F 2001/13606* (2013.01); *G09G 2320/0209* (2013.01); *G09G 2330/12* (2013.01)

(56) References Cited

U.S. PATENT DOCUMENTS

| | | | | |
|---|---|---|---|---|
| 2008/0013009 | A1* | 1/2008 | Inada | G02F 1/136286 349/46 |
| 2011/0221983 | A1* | 9/2011 | Lee | G09G 3/3655 349/33 |
| 2014/0267967 | A1* | 9/2014 | Ro | G01R 13/405 349/43 |

FOREIGN PATENT DOCUMENTS

| | | |
|---|---|---|
| KR | 10-0687325 B1 | 2/2007 |
| KR | 10-1232151 B1 | 2/2013 |
| KR | 10-2014-0113034 A | 9/2014 |
| KR | 10-2016-0030598 A | 3/2016 |
| KR | 10-1798868 B1 | 12/2017 |

\* cited by examiner

DISPLAY DEVICE

CROSS-REFERENCE TO RELATED APPLICATION

This application claims priority to and the benefit of Korean Patent Application No. 10-2019-0013737 filed in the Korean Intellectual Property Office on Feb. 1, 2019; the entire contents of the Korean Patent Application are incorporated herein by reference.

BACKGROUND

(a) Field

The technical field relates to a display device.

(b) Description of the Related Art

A display device, such as a liquid crystal display device, may include a pixel electrode, a common electrode, and a liquid crystal layer interposed between the electrodes. Liquid crystal molecules of the liquid crystal layer are rearranged according to voltages applied to the electrodes, for adjusting transmittance of light to display an image.

In the liquid crystal display, to prevent degradation of the liquid crystal layer, a polarity of one or more of the voltages may be inverted for each pixel column. A parasitic capacitor may be formed between the pixel electrode and an adjacent data line. A voltage deviation of a positive or negative polarity may occur in the pixel voltage due to the parasitic capacitor. In inverting the polarity of a voltage for each pixel column, the data line maintains the same polarity for one frame. The voltage deviation may cause undesirable vertical crosstalk in the display image. As a result, the image display quality may be unsatisfactory.

The above information disclosed in this Background section is for enhancement of understanding of the background of the application. This Background section may contain information that does not form the prior art that is already known in this country to a person of ordinary skill in the art.

SUMMARY

Embodiments may be related a display device that is capable of minimizing display quality deterioration potentially caused by the parasitic capacitor formed between a pixel electrode and a data line adjacent to the pixel electrode.

A display device according to an embodiment includes: a pixel electrode; a first data line electrically connected to the pixel electrode; a second data line adjacent to the pixel electrode without being electrically connected to the pixel electrode; a first sensing electrode disposed on the same layer as the pixel electrode; a second sensing electrode disposed on the same layer as the first sensing electrode and separated from the first sensing electrode by a predetermined distance; and a third sensing electrode disposed on the same layer as the first data line and the second data line, partially overlapping the first sensing electrode to form a first sensing capacitor, and partially overlapping the second sensing electrode to form a second sensing capacitor.

The first sensing electrode may include a first connection portion extending in a first direction and a first extending portion extending from the first connection portion in a second direction, the second sensing electrode may include a second connection portion extending in the first direction and a second extending portion extending from the second connection portion in the second direction, the third sensing electrode may include a third connection portion extending in the first direction and a third extending portion extending from the third connection portion in the second direction, and the third extending portion may overlap a part of the first extending portion and a part of the second extending portion.

A capacitance of the second sensing capacitor may correspond to a capacitance of a first parasitic capacitor formed between the pixel electrode and the first data line, and a capacitance of the first sensing capacitor may correspond to a capacitance of a second parasitic capacitor formed between the pixel electrode and the second data line.

When a first reference voltage is applied to the first sensing electrode and a second reference voltage is applied to the second sensing electrode, a voltage between the first reference voltage and the second reference voltage may be formed at the third sensing electrode.

A power supply unit feeding back the voltage formed at the third sensing electrode as a measuring voltage, measuring the capacitance of the first parasitic capacitor formed between the pixel electrode and the first data line from the measuring voltage, and measuring the capacitance of the second parasitic capacitor formed between the pixel electrode and the second data line, may be further included.

A memory storing the capacitance of the first parasitic capacitor and the second parasitic capacitor may be further included.

A signal controller generating an image data signal by correcting an image signal when the capacitance of the first parasitic capacitor is larger than the capacitance of the second parasitic capacitor so that a data voltage of a low gray becomes a voltage of a lower gray may be further included.

A signal controller generating an image data signal by correcting an image signal when the capacitance of the second parasitic capacitor is larger than the capacitance of the first parasitic capacitor so that a data voltage of a low gray becomes a voltage of a higher gray may be further included.

A signal controller generating an image data signal by correcting an image signal when the capacitance of the second sensing capacitor is larger than the capacitance of the first sensing capacitor so that the data voltage of the low gray becomes the voltage of the lower gray may be further included.

A signal controller generating an image data signal by correcting an image signal when the capacitance of the first sensing capacitor is larger than the capacitance of the second sensing capacitor so that the data voltage of a low gray becomes the voltage of a higher gray may be further included.

A display device according to another embodiment includes: a pixel electrode; a first data line electrically connected to the pixel electrode; a second data line adjacent to the pixel electrode without being electrically connected to the pixel electrode; a first sensing electrode disposed on the same layer as the first data line and the second data line; a second sensing electrode disposed on the same layer as the first sensing electrode and separated from the first sensing electrode by a predetermined distance; and a third sensing electrode disposed on the same layer as the pixel electrode, partially overlapping the first sensing electrode to form a first sensing capacitor, and partially overlapping the second sensing electrode to form a second sensing capacitor.

The capacitance of the first sensing capacitor may correspond to the capacitance of a first parasitic capacitor formed between the pixel electrode and the first data line, and the capacitance of the second sensing capacitor may correspond to a capacitance of a second parasitic capacitor formed between the pixel electrode and the second data line.

A signal controller generating an image data signal by correcting an image signal when the capacitance of the first parasitic capacitor is larger than the capacitance of the second parasitic capacitor so that a data voltage of a low gray becomes the voltage of a lower gray may be further included.

A signal controller generating an image data signal by correcting an image signal when the capacitance of the second parasitic capacitor is larger than the capacitance of the first parasitic capacitor so that a data voltage of a low gray becomes a voltage of a higher gray may be further included.

A signal controller generating an image data signal by correcting an image signal when the capacitance of the first sensing capacitor is larger than the capacitance of the second sensing capacitor so that the data voltage of the low gray becomes the voltage of the lower gray may be further included.

A signal controller generating an image data signal by correcting an image signal when the capacitance of the second sensing capacitor is larger than the capacitance of the first sensing capacitor so that the data voltage of the low gray becomes the voltage of the higher gray may be further included.

A display device according to another embodiment includes: a first display area including a plurality of pixel electrodes and a plurality of data lines; a second display area including a plurality of pixel electrodes and a plurality of data lines; a first panel sensor for measuring a first parasitic capacitance according to an alignment error of the pixel electrode and the data line included in the first display area; a second panel sensor for measuring a second parasitic capacitance according to an alignment error of the pixel electrode and the data line included in the second display area; a memory storing the first and second parasitic capacitances; and a signal controller generating an image data signal for compensating the first and second parasitic capacitances.

Each of the first panel sensor and the second panel sensor may include: a first sensing electrode disposed on the same layer as the plurality of pixel electrodes; a second sensing electrode disposed on the same layer as the first sensing electrode and separated from the first sensing electrode by a predetermined distance; and a third sensing electrode disposed on the same layer as the plurality of data lines, partially overlapping the first sensing electrode to form a first sensing capacitor, and partially overlapping the second sensing electrode to form a second sensing capacitor.

When a first separation distance between a first data line electrically connected to the pixel electrode and the pixel electrode is smaller than a second separation distance between a second data line without being electrically connected to the pixel electrode and the pixel electrode, the signal controller may correct the image signal to generate the image data signal so that a data voltage of a low gray becomes a voltage of a lower gray.

When a first separation distance between a first data line electrically connected to the pixel electrode and the pixel electrode is larger than a second separation distance between a second data line without being electrically connected to the pixel electrode and the pixel electrode, the signal controller may correct the image signal to generate the image data signal so that a data voltage of a low gray becomes a voltage of a higher gray.

The parasitic capacitance between the pixel electrode and the data line adjacent thereto may be measured, and the display quality deterioration phenomenon such as the vertical crosstalk may be improved by compensating the data voltage by corresponding to the parasitic capacitance.

An embodiment may be related to a display device. The display device may include the following elements: a first insulating layer; a second insulating layer overlapping the first insulating layer; a pixel electrode disposed directly on a face of the second insulating layer; a first data line disposed directly on a face of the first insulating layer and electrically connected to the pixel electrode; a second data line disposed directly on the face of the first insulating layer and disposed adjacent to the pixel electrode without being electrically connected to the pixel electrode; a first sensing electrode disposed directly on the face of the second insulating layer; a second sensing electrode disposed on the face of the second insulating layer and separated from the first sensing electrode by a predetermined distance; and a third sensing electrode disposed directly on the face of the first insulating layer, partially overlapping the first sensing electrode to form a first sensing capacitor, and partially overlapping the second sensing electrode to form a second sensing capacitor.

The first sensing electrode may include a first connection portion extending in a first direction and a first extending portion extending from the first connection portion in a second direction. The second sensing electrode may include a second connection portion extending in the first direction and a second extending portion extending from the second connection portion in the second direction. The third sensing electrode may include a third connection portion extending in the first direction and a third extending portion extending from the third connection portion in the second direction. The third extending portion may overlap a part of the first extending portion and a part of the second extending portion.

A capacitance of the second sensing capacitor may correspond to a capacitance of a first parasitic capacitor formed between the pixel electrode and the first data line. A capacitance of the first sensing capacitor may correspond to a capacitance of a second parasitic capacitor formed between the pixel electrode and the second data line.

When a first reference voltage is applied to the first sensing electrode and when a second reference voltage is applied to the second sensing electrode, a voltage between the first reference voltage and the second reference voltage may be formed at the third sensing electrode.

The display device may include a power supply unit receiving the voltage formed at the third sensing electrode as a measuring voltage, measuring a capacitance of a first parasitic capacitor formed between the pixel electrode and the first data line using the measuring voltage, and measuring a capacitance of a second parasitic capacitor formed between the pixel electrode and the second data line.

The display device may include a memory storing the capacitance of the first parasitic capacitor and the second parasitic capacitor.

The display device may include a signal controller generating an image data signal by correcting an image signal when the capacitance of the first parasitic capacitor is larger than the capacitance of the second parasitic capacitor. A magnitude of a data voltage associated with the image data signal is less than a magnitude of a data voltage associated with the image signal. The data voltage according to the image data signal may be provided to the pixel electrode.

The display device may include a signal controller generating an image data signal by correcting an image signal when the capacitance of the second parasitic capacitor is larger than the capacitance of the first parasitic capacitor. A magnitude of a data voltage associated with the image data signal is greater than a magnitude of a data voltage associated with the image signal. The data voltage according to the image data signal may be provided to the pixel electrode.

The display device may include a signal controller generating an image data signal by correcting an image signal when the capacitance of the second sensing capacitor is larger than the capacitance of the first sensing capacitor. A magnitude of a data voltage associated with the image data signal is less than a magnitude of a data voltage associated with the image signal. The data voltage according to the image data signal may be provided to the pixel electrode.

The display device may include a signal controller generating an image data signal by correcting an image signal when the capacitance of the first sensing capacitor is larger than the capacitance of the second sensing capacitor. A magnitude of a data voltage associated with the image data signal is greater than a magnitude of a data voltage associated with the image signal. The data voltage according to the image data signal may be provided to the pixel electrode.

An embodiment may be related to a display device. The display device may include the following elements: a first insulating layer; a second insulating layer overlapping the first insulating layer; a pixel electrode disposed directly on a face of the second insulating layer; a first data line disposed directly on a face of the first insulating layer and electrically connected to the pixel electrode; a second data line disposed directly on the face of the first insulating layer and disposed adjacent to the pixel electrode without being electrically connected to the pixel electrode; a first sensing electrode disposed directly on the face of the first insulating layer; a second sensing electrode disposed directly on the face of the first insulating layer and separated from the first sensing electrode by a predetermined distance; and a third sensing electrode disposed directly on the face of the second insulating layer, partially overlapping the first sensing electrode to form a first sensing capacitor, and partially overlapping the second sensing electrode to form a second sensing capacitor.

A capacitance of the first sensing capacitor may correspond to a capacitance of a first parasitic capacitor formed between the pixel electrode and the first data line. A capacitance of the second sensing capacitor may correspond to a capacitance of a second parasitic capacitor formed between the pixel electrode and the second data line.

The display device may include a signal controller generating an image data signal by correcting an image signal when the capacitance of the first parasitic capacitor is larger than the capacitance of the second parasitic capacitor. A magnitude of a data voltage associated with the image data signal is less than a magnitude of a data voltage associated with the image signal. The data voltage according to the image data signal may be provided to the pixel electrode.

The display device may include a signal controller generating an image data signal by correcting an image signal when the capacitance of the second parasitic capacitor is larger than the capacitance of the first parasitic capacitor. A magnitude of a data voltage associated with the image data signal is greater than a magnitude of a data voltage associated with the image signal. The data voltage according to the image data signal may be provided to the pixel electrode.

The display device may include a signal controller generating an image data signal by correcting an image signal when the capacitance of the first sensing capacitor is larger than the capacitance of the second sensing capacitor. A magnitude of a data voltage associated with the image data signal is less than a magnitude of a data voltage associated with the image signal. The data voltage according to the image data signal may be provided to the pixel electrode.

The display device may include a signal controller generating an image data signal by correcting an image signal when the capacitance of the second sensing capacitor is larger than the capacitance of the first sensing capacitor. A magnitude of a data voltage associated with the image data signal is greater than a magnitude of a data voltage associated with the image signal. The data voltage according to the image data signal may be provided to the pixel electrode.

An embodiment may be related to a display device. The display device may include the following elements: a first display area including a first pixel electrode and a first data line; a second display area including a second pixel electrode and a second data line; a first panel sensor for measuring a first parasitic capacitance related to an alignment error of the first pixel electrode and the first data line; a second panel sensor for measuring a second parasitic capacitance related to an alignment error of the second pixel electrode and the second data line; a memory storing the first parasitic capacitance and the second parasitic capacitance; and a signal controller generating an image data signal based on the first parasitic capacitance and the second parasitic capacitance.

The display device may include the following elements: a first insulating; and a second insulating overlapping the first insulating layer. The first pixel electrode may be disposed directly on a face of the second insulating layer. The first data line may be disposed directly on a face of the first insulating layer. The first panel sensor may include the following elements: a first sensing electrode disposed on the face of the second insulating layer; a second sensing electrode disposed on the face of the second insulating layer separated from the first sensing electrode by a predetermined distance; and a third sensing electrode disposed on the face of the first insulating layer, partially overlapping the first sensing electrode to form a first sensing capacitor, and partially overlapping the second sensing electrode to form a second sensing capacitor.

The first data line may be electrically connected to the first pixel electrode. A third data line may immediately neighbor the first pixel electrode and may not be electrically connected to the first pixel electrode. When a separation distance between the first data line and the first pixel electrode is smaller than a separation distance between the third data line and the first pixel electrode, the signal controller may correct an image signal to generate the image data signal. A magnitude of a data voltage associated with the image data signal is less than a magnitude of a data voltage associated with the image signal. The data voltage according to the image data signal may be provided to the pixel electrode.

The first data line may be electrically connected to the first pixel electrode. A third data line may immediately neighbor the first pixel electrode and may not be electrically connected to the first pixel electrode. When a separation distance between the first data line and the first pixel electrode is larger than a separation distance between the third data line and the first pixel electrode, the signal controller may correct an image signal to generate the image data signal. A magnitude of a data voltage associated with the image data signal is greater than a magnitude of a data voltage associated with the image signal. The data voltage according to the image data signal may be provided to the pixel electrode.

DETAILED DESCRIPTION

Figure 1:
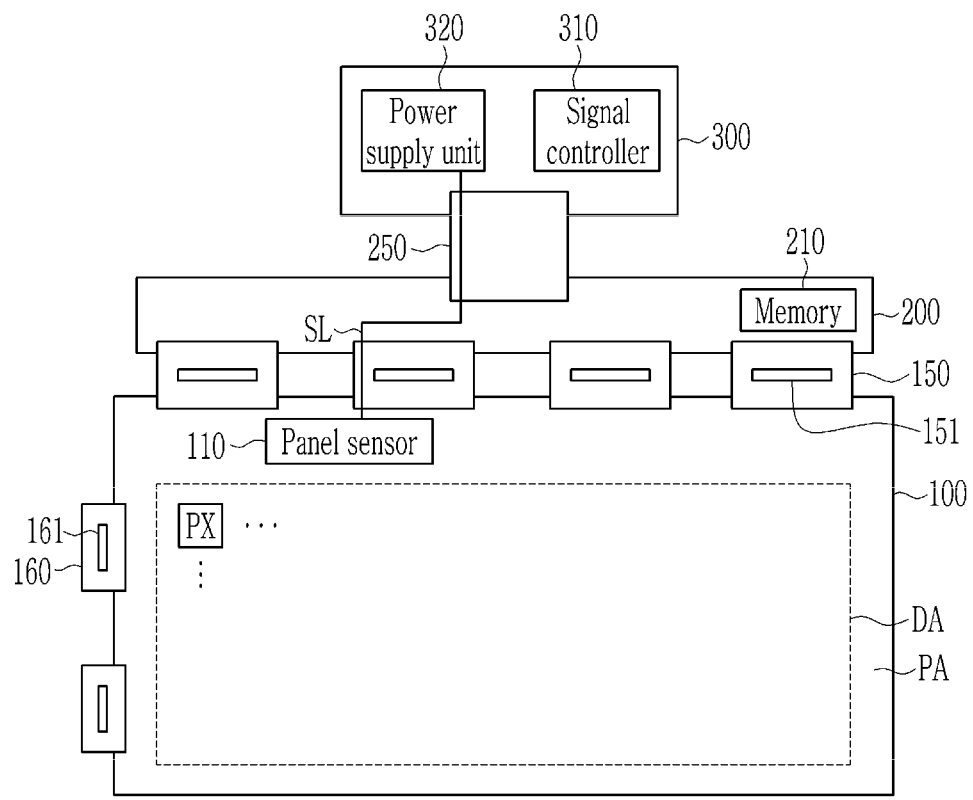
FIG. 1 is a block diagram schematically showing a display device according to an embodiment.

Embodiments are described with reference to the accompanying drawings. The described embodiments may be modified in various ways.

The drawings and description are illustrative and not restrictive. Like reference numerals may designate like elements.

In the drawings, thicknesses of layers, films, panels, regions, etc., may be exaggerated for clarity.

Although the terms "first," "second," etc. may be used to describe various elements, these elements, should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

When a first element is referred to as being "on" a second element, the first element can be directly on the second element, or one or more intervening elements may be present between the first element and the second element. When a first element is referred to as being "directly on" a second element, there are no intended intervening elements (except environmental elements such as air) present between the first element and the second element.

Unless explicitly described to the contrary, the word "comprise" and variations such as "comprises" or "comprising" may imply the inclusion of stated elements but may not imply the exclusion of any other elements.

The expression that an element extends in a first direction may mean that the lengthwise direction of the element is the first direction. The expression that two elements are disposed on the same layer may mean that the two elements are disposed directly and/or directly contact the same face of the same layer. The expression that a first element is disposed on the same layer as a second layer may mean that the first element and the second element are disposed directly and/or directly contact the same face of the same layer. The term "measure" may mean "determine." The term "connect" may mean "electrically connect." The term "insulate" may mean "electrically insulate." A "first data line" may mean a "connected data line" that is electrically connected to a pixel; a "second data line" may mean an "unconnected data line" that is adjacent to the pixel and is not electrically connected to the pixel.

FIG. 1 is a block diagram schematically showing a display device according to an embodiment.

Referring to FIG. 1, the display device may include a display substrate 100, a first flexible printed circuit board (FPCB) 150, a second flexible printed circuit board 160, a first printed circuit board (PCB) 200, a connecting portion 250 (or connecting member 250), and a second printed circuit board (PCB) 300.

The display substrate 100 includes a display area DA and a peripheral area PA. The display area DA may include a plurality of pixels PX and may include a plurality of gate lines and a plurality of data lines that are connected to the plurality of pixels PX. Each of the pixels PX includes a pixel electrode (referring to PE of FIG. 2) to which a data voltage or a voltage corresponding to the data voltage is applied. The peripheral area PA may be disposed around the display area DA and may surround the display area DA. The peripheral area PA may include a panel sensor 110.

A plurality of first flexible circuit boards 150 may be provided, and the plurality of first flexible circuit boards 150 may be connected to the display substrate 100 at one edge of the display substrate 100. Each of the first flexible circuit boards 150 may include/support a first driving circuit unit 151. A first driving circuit unit 151 may be a data driver applying a data voltage to one or more of the pixels PX. A first flexible circuit board 150 may be electrically connected on the display substrate 100 by an anisotropic conductive film (ACF) in the peripheral area PA. The first flexible circuit board 150 may include a flexible circuit film, and the first driving circuit unit 151 may be mounted on the first flexible circuit board 150 as a chip on film (COF).

A plurality of second flexible circuit boards 160 may be provided, and the plurality of second flexible circuit boards 160 may be connected to the display substrate 100 at another edge of the display substrate 100. Each of the second flexible circuit boards 160 may include/support a second driving circuit unit 161. A second driving circuit unit 161 may be a gate driver applying a gate signal to one or more of the pixels PX. A second flexible circuit board 160 may be electrically connected to the display substrate 100 by the/an anisotropic conductive film in the peripheral area PA. The second flexible circuit board 160 may include a flexible circuit film, and the second driving circuit unit 161 may be mounted to the second flexible circuit board 160 as a chip on film (COF).

The first printed circuit board (PCB) 200 may include/support a memory 210 storing information for driving the plurality of pixels PX. The memory 210 may be mounted to the first printed circuit board (PCB) 200 as a chip on board (COB). The first printed circuit board (PCB) 200 may be electrically connected to one edge of the display substrate 100 through the first flexible circuit boards 150. The first printed circuit board (PCB) 200 may be electrically connected to a first flexible circuit board 150 by the/an anisotropic conductive film (ACF). In FIG. 1, the first printed circuit board (PCB) 200 has one substrate. A plurality of first printed circuit boards (PCB) 200 may be provided according to an embodiment, and the plurality of first printed circuit boards (PCB) 200 may be electrically connected to the display substrate 100 through different first flexible circuit boards 150, respectively.

The second printed circuit board (PCB) 300 may include/support a signal controller 310 for controlling emission of the plurality of pixels PX, and may include/support a power supply unit 320 providing a power voltage required for driving the plurality of pixels PX. The signal controller 310 may control output of data voltages of the first driving circuit units 151 and output of gate signals of the second driving circuit units 161 based on an image signal and a synchronization signal that are input from an external device. Each of signal controller 310 and the power supply unit 320 may be mounted to the second printed circuit board (PCB) 300 as a chip on board (COB). In FIG. 1, the signal controller 310 and the power supply unit 320 are shown to be separated. The signal controller 310 may include the power supply unit 320 according to an embodiment.

The connecting portion 250 electrically connects the first printed circuit board (PCB) 200 and the second printed circuit board (PCB) 300. The connecting portion 250 may be electrically connected to the first printed circuit board (PCB) 200 and the second printed circuit board (PCB) 300 by one or more anisotropic conductive films (ACF). The connecting portion 250 may include a flexible circuit film and/or a wiring cable.

The panel sensor 110 disposed in the peripheral area PA may be connected to the power supply unit 320 via a signal wire SL. The signal wire SL may electrically connect the panel sensor 110 and the power supply unit 320 through the peripheral area PA, a first flexible circuit board 150, the first printed circuit board (PCB) 200, the connecting portion 250, and the second printed circuit board (PCB) 300. In FIG. 1, one signal wire SL is shown, but the signal wire SL may include a plurality of wires.

The power supply unit 320 applies a reference voltage to the panel sensor 110 through the signal wire SL, and receives a measuring voltage from the panel sensor 110 through the signal wire SL to measure a parasitic capacitance between the pixel electrode PE and a data line adjacent to the pixel electrode PE. The power supply unit 320 may store the measured parasitic capacitance in the memory 210. The signal controller 310 reads a value of the parasitic capacitance stored in the memory 210, generates an image data signal by correcting an image signal to compensate the parasitic capacitance, and transmits the image data signal to a first driving circuit unit 151. The first driving circuit unit 151 outputs the data voltage compensating the parasitic capacitance according to the image data signal to one or more of the data lines. Advantageously, unwanted vertical crosstalk potentially caused by the parasitic capacitance may be prevented or minimized.

Figure 2:
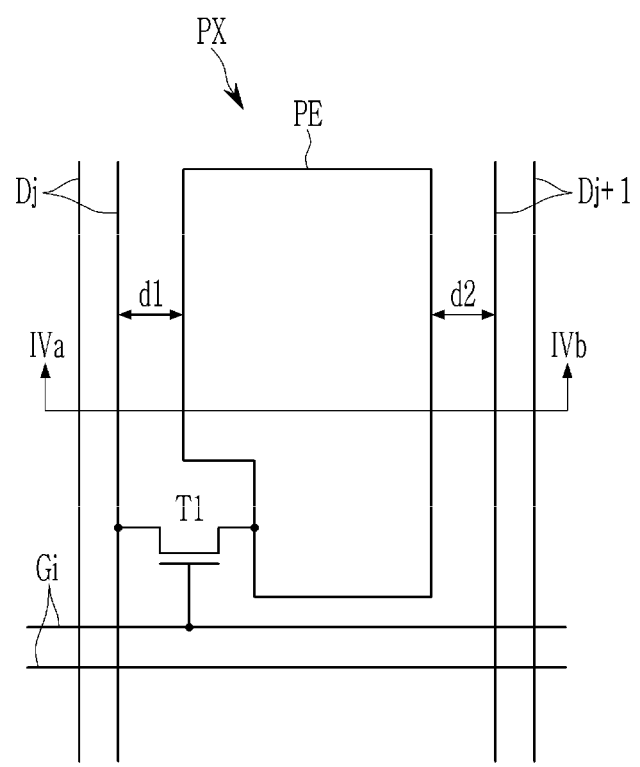
FIG. 2 is a layout view (or plan view) schematically showing a pixel according to an embodiment.
Figure 3:
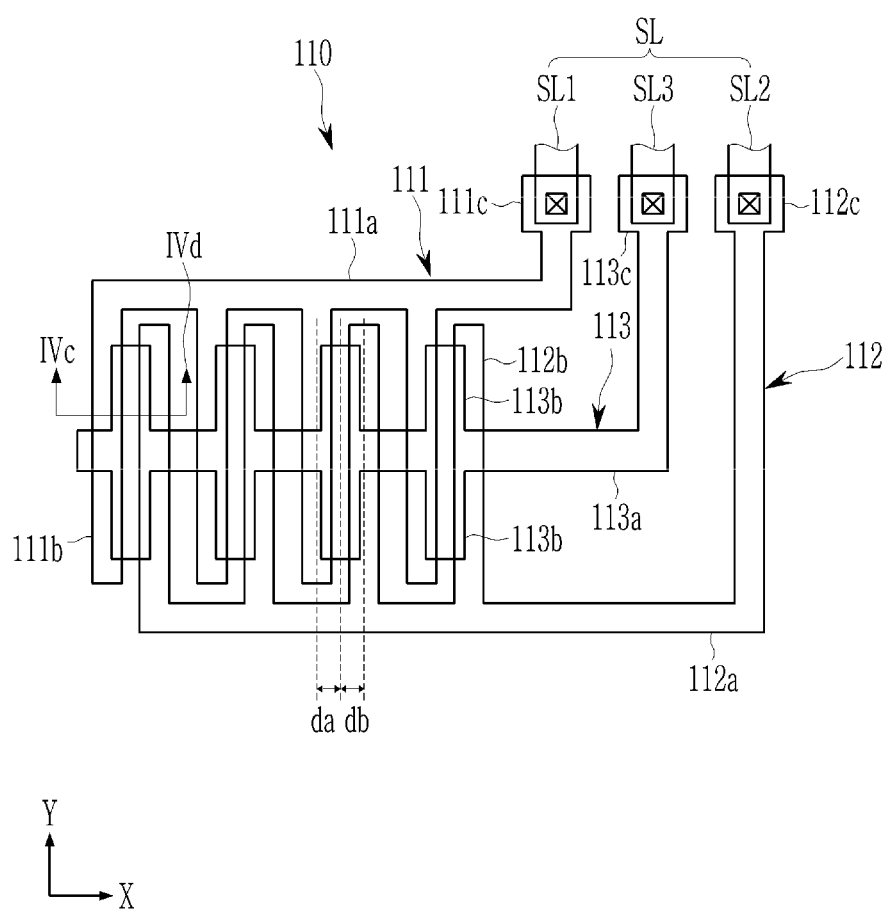
FIG. 3 is a layout view showing a panel sensor according to an embodiment.
Figure 4:
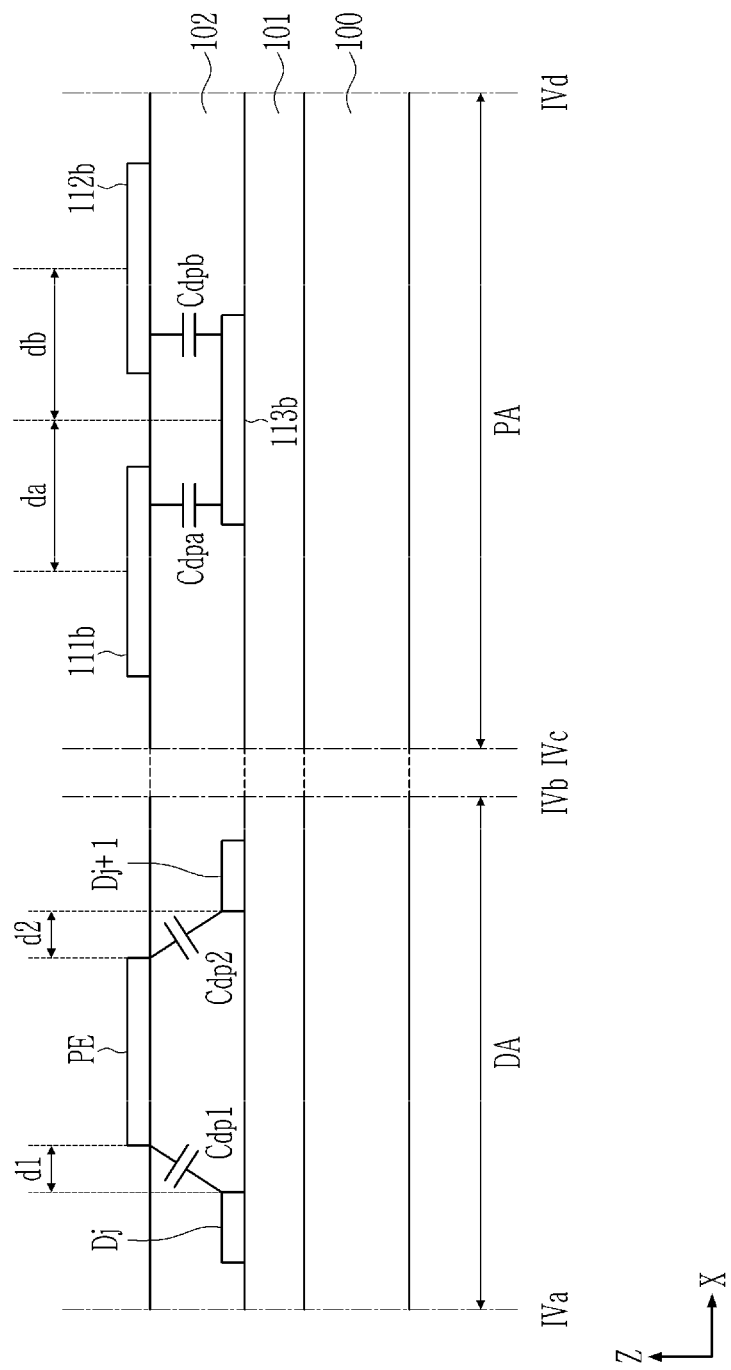
FIG. 4 is a cross-sectional view taken along lines IVa-IVb of FIG. 2 and IVc-IVd of FIG. 3 according to an embodiment.

FIG. 2 is a layout view schematically showing a pixel according to an embodiment. FIG. 3 is a layout view showing a panel sensor according to an embodiment. FIG. 4 is a cross-sectional view taken along lines IVa-IVb of FIG. 2 and IVc-IVd of FIG. 3 according to an embodiment.

Referring to FIG. 2, each of the pixels PX includes a pixel electrode PE and a switching transistor T1. In the display area DA, the plurality of gate lines may extend in a first direction X and the plurality of data lines may extend in a second direction Y different from the first direction X. The second direction Y may be perpendicular to the first direction X. The first direction X may include one or more of a row direction, a horizontal direction, a right direction, a left direction, and the like on a plane, and the second direction Y may include one or more of a column direction, a vertical direction, an upper direction, a lower direction, and the like on a plane.

FIG. 2 shows one gate line Gi and two data lines Dj and D(j+1) adjacent to the pixel electrode PE of one pixel PX. The gate line Gi extends in the first direction X, and the data lines Dj and D(j+1) extend in the second direction Y.

The switching transistor T1 may include a gate electrode connected to the gate line Gi, a first electrode connected to the first data line Dj, and a second electrode connected to the pixel electrode PE. The switching transistor T1 is turned on depending on the gate signal applied to the gate line Gi such that the data voltage applied to the first data line Dj may be transmitted to the pixel electrode PE.

In FIG. 2, the first data line Dj disposed on the left side of the pixel electrode PE is electrically connected to the pixel electrode PE through the switching transistor T1. The second data line D(j+1) disposed on the right side of the pixel electrode PE is not electrically connected to the pixel electrode PE, but is electrically connected to another pixel electrode adjacent to the pixel electrode PE.

In an embodiment, a first data line may be disposed on the right side of the pixel electrode PE, a second data line may be disposed on the left side of the pixel electrode PE, and a switching transistor may be configured to connect the first data line to the pixel electrode PE.

The pixel electrode PE may be separated from the first data line Dj in the first direction X by a first separation distance d1. The pixel electrode PE may be separated from the second data line D(j+1) in the first direction X by a second separation distance d2.

As illustrated in FIG. 4, the pixel electrode PE and the data lines Dj and D(j+1) may be disposed on different layers. For example, a first insulating layer 101 may be disposed on the display substrate 100, the data lines Dj and D(j+1) may be disposed on the first insulating layer 101, a second insulating layer 102 may be disposed on the data lines Dj and D(j+1), and the pixel electrode PE may be disposed on the second insulating layer 102. The data lines Dj and D(j+1) may include a conductive metal and/or a semiconductor material with an equivalent conductive characteristic. The first insulating layer 101 and the second insulating layer 102 may include an inorganic insulating material such as a silicon nitride (SiNx), a silicon oxide (SiOx), a silicon oxynitride (SiON), and/or an organic insulating material.

Although not shown in FIG. 4, a liquid crystal layer is disposed on the pixel electrode PE and an upper substrate is disposed on the liquid crystal layer. A common electrode may be disposed on the upper substrate or at a position separated from the pixel electrode PE, and an electric field corresponding to the voltage difference between the pixel electrode and the common electrode may be generated in the liquid crystal layer.

Referring to FIG. 3, the panel sensor 110 includes a first sensing electrode 111, a second sensing electrode 112, and a third sensing electrode 113.

The first sensing electrode 111 may include a first connection portion 111a, a first extending portion 111b, and a first pad portion 111c. The first extending portion 111b extends from the first connection portion 111a in the second direction Y. As shown in FIG. 3, a plurality of first extending portions 111b may extend from the first connection portion 111a in the lower direction toward a second connection portion 112a. The first connection portion 111a extends in the first direction X, and the first pad portion 111c may be connected to an end of the first connection portion 111a. If necessary, a part of the first connection portion 111a may be bent in the second direction Y to be connected to the first pad portion 111c. The first pad portion 111c is wider than the first connection portion 111a in a width direction of the first connection portion 111a.

The second sensing electrode 112 may include the second connection portion 112a, a second extending portion 112b, and a second pad portion 112c. The second extending portion 112b extends from the second connection portion 112a in the second direction Y. As shown in FIG. 3, the plurality of second extending portion 112b may extend from the second connection portion 112a in the upper direction toward the first connection portion 111a. The plurality of second extending portions 112b do not overlap the plurality of first extending portions 111b, and the first extending portions 111b and the second extending portions 112b may be separated by a predetermined distance and alternately arranged. The second connection portion 112a extends in the first direction X, and the second pad portion 112c may be connected to the end of the second connection portion 112a. If necessary, a part of the second connection portion 112a may be bent in the second direction Y to be connected to the second pad portion 112c. The second pad portion 112c is wider than the second connection portion 112a in a width direction of the second connection portion 112a.

The third sensing electrode 113 may include a third connection portion 113a, a third extending portion 113b, and a third pad portion 113c. The third extending portion 113b extends from the third connection portion 113a in the second direction Y. As shown in FIG. 3, the plurality of third extending portions 113b may extend from the third connection portion 113a in the upper direction and the lower direction toward the first connection portion 111a and the second connection portion 112a. The third connection portion 113a extends in the first direction X, and the third pad portion 113c may be connected to the end of the third connection portion 113a. If necessary, a part of the third connection portion 113a may be bent in the second direction Y to be connected to the third pad portion 113c. The third pad portion 113c is wider than the third connection portion 113a in a width direction of the third connection portion 113a.

The signal wire SL connected to the panel sensor 110 may include a first signal wire SL1, a second signal wire SL2, and a third signal wire SL3. One end of the first signal wire SL1 may be connected to the first pad portion 111c, and the other end of the first signal wire SL1 may be connected to the power supply unit 320. One end of the second signal wire SL2 may be connected to the second pad portion 112c, and the other end of the second signal wire SL2 may be connected to the power supply unit 320. One end of the third signal wire SL3 may be connected to the third pad portion 113c, and the other end of the third signal wire SL3 may be connected to the power supply unit 320.

The first sensing electrode 111 and the second sensing electrode 112 are disposed on the same layer, and the third sensing electrode 113 is disposed on a different layer. Each of the third extending portions 113b of the third sensing electrode 113 may be disposed between the first connection portion 111a and the second connection portion 112a, may partially overlap a first extending portion 111b, and may partially overlap a second extending portion 112b. A center line of the third extending portion 113b extending in the second direction Y may be disposed between the first extending portion 111b and the second extending portion 112b. The center line of the third extending portion 113b and the center line of the first extending portion 111b in the second direction Y may be separated by a first electrode distance da, and the center line of the third extending portion 113b and the center line of the second extending portion 112b in the second direction Y may be separated by a second electrode distance db.

As shown in FIG. 4, the first extending portion 111b of the first sensing electrode 111 and the second extending portion 112b of the second sensing electrode 112 may be disposed on the second insulating layer 102, and the third extending portion 113b of the third sensing electrode 113 may be disposed between the first insulating layer 101 and the second insulating layer 102. The first sensing electrode 111 and the second sensing electrode 112 are disposed on the same layer as the pixel electrode PE, and the third sensing electrode 113 is disposed on the same layer as the data lines Dj and D(j+1). When the data lines Dj and D(j+1) are formed in the display area DA, the third sensing electrode 113 is formed in the peripheral area PA. When the pixel electrode PE is formed in the display area DA, the first sensing electrode 111 and the second sensing electrode 112 are formed in the peripheral area PA.

As the first sensing electrode 111 and the second sensing electrode 112 are formed along with the pixel electrode PE, and as the third sensing electrode 113 is formed along with the data lines Dj and D(j+1), a ratio of the first electrode distance da and the second electrode distance db may correspond to a ratio of the second separation distance d2 and the first separation distance d1. The first electrode distance da may correspond to the second separation distance d2, and the second electrode distance db may correspond to the first separation distance d1. The ratio of da to db may be equal to the ratio of d2 to d1; i.e., da/db=d2/d1.

A first parasitic capacitor Cdp1 may be formed between the pixel electrode PE and the first data line Dj, and a second parasitic capacitor Cdp2 may be formed between the pixel electrode PE and the second data line D(j+1). In the panel sensor 110, a first sensing capacitor Cdpa may be formed between the first sensing electrode 111 and the third sensing electrode 113, and a second sensing capacitor Cdpb may be formed between the second sensing electrode 112 and the third sensing electrode 113.

As the first sensing electrode 111 and the second sensing electrode 112 are formed along with the pixel electrode PE, and as the third sensing electrode 113 is formed along with the data lines Dj and D(j+1), a capacitance ratio of the first sensing capacitor Cdpa and the second sensing capacitor Cdpb may correspond to (e.g., equal to) a capacitance ratio of the second parasitic capacitor Cdp2 and the first parasitic capacitor Cdp1. The capacitance of the first sensing capacitor Cdpa may correspond to the capacitance of the second parasitic capacitor Cdp2, and the capacitance of the second sensing capacitor Cdpb may correspond to the capacitance of the first parasitic capacitor Cdp1. The ratio of the Cdpa capacitance to the Cdpb capacitance may be equal to the ratio of the Cdp2 capacitance to the Cdp1 capacitance; i.e., (Cdpa capacitance)/(Cdpb capacitance)=(Cdp2 capacitance)/(Cdp1 capacitance).

In the manufacturing process of the display device, the data lines Dj and D(j+1) and the third sensing electrode 113 may be patterned using one mask. The pixel electrode PE, the first sensing electrode 111, and the second sensing electrode 112 may be patterned using another mask. The display device is manufactured by aligning the masks so that the first separation distance d1 and the second separation distance d2 are equal. If an alignment error occurs such that the first separation distance d1 is unequal to the second separation distance d2, and if no compensation is performed, unwanted vertical crosstalk may occur. In embodiments, a data voltage compensating an error in the parasitic capacitances Cdp1 and Cdp2 is applied to one or more of the pixels PX, so as to prevent or minimize the vertical crosstalk.

Figure 5:
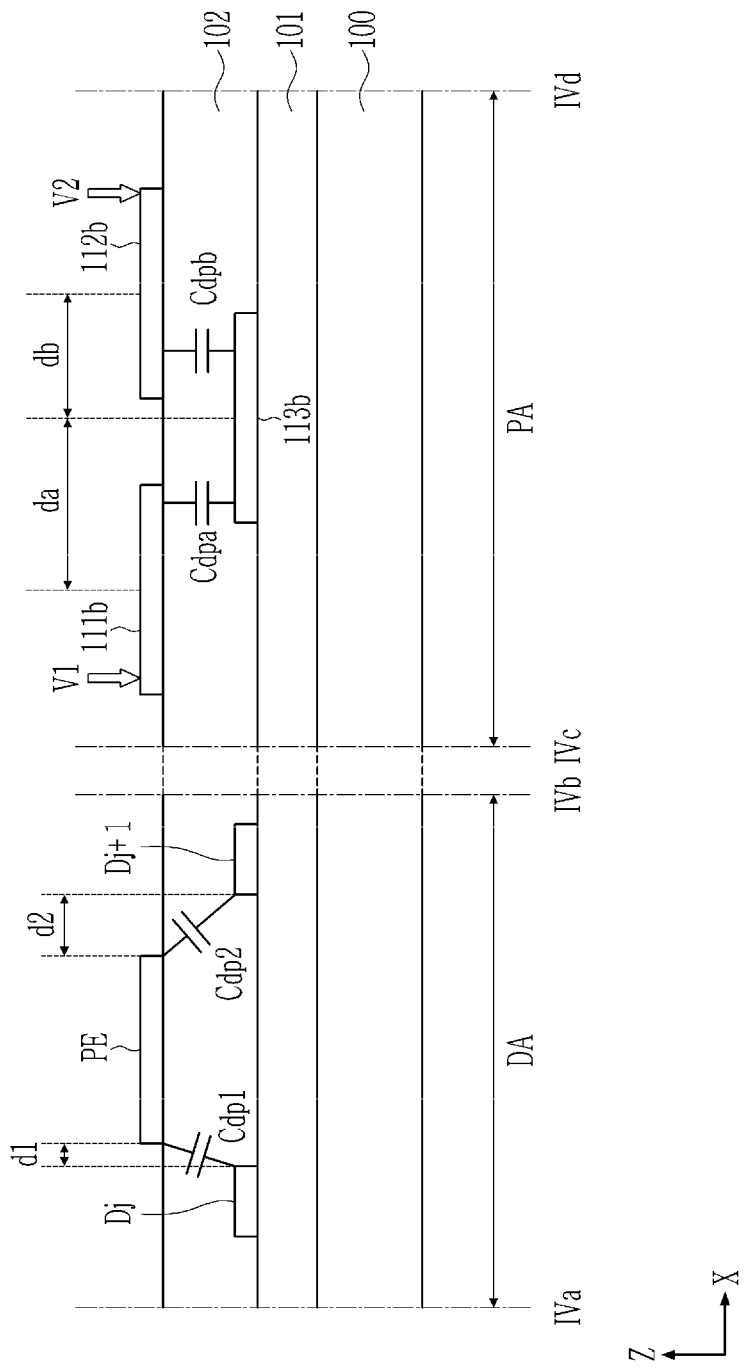
FIG. 5 is a view showing an example of an alignment error of a pixel electrode and a data line according to an embodiment.
Figure 6:
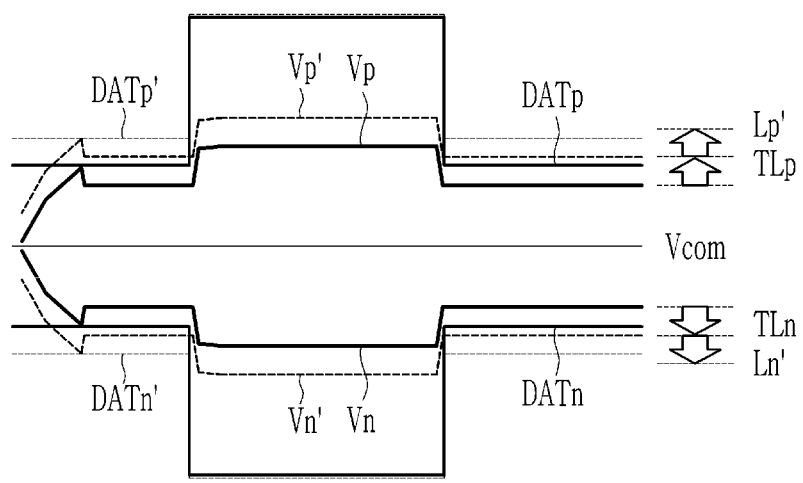
FIG. 6 is a view showing a method for compensating an alignment error of a pixel electrode and a data line of FIG. 5 according to an embodiment.

FIG. 5 is a view showing an example of an alignment error of a pixel electrode and a data line according to an embodiment. FIG. 6 is a view showing a method of compensating an alignment error of a pixel electrode and a data line of FIG. 5 according to an embodiment.

FIG. 5 shows that the pixel electrode PE is disposed closer to the first data line Dj than the second data line D(j+1). Compared with the corresponding distances shown in FIG. 4, the first separation distance d1 decreases, and the second separation distance d2 increases. The first separation distance d1 is smaller than the second separation distance d2. Thus, the parasitic capacitance of the first parasitic capacitor Cdp1 is greater than the parasitic capacitance of the second parasitic capacitor Cdp2.

With the state of this alignment error, referring to FIG. 6, a positive data voltage Vp' of a low gray is input to the pixel electrode PE of one pixel PX, a positive data voltage DATp' applied to the first data line Dj during one frame may be changed from a low gray to a high gray, and a negative data voltage DATn' applied to the second data line D(j+1) may be changed from a low gray to a high gray. The data voltages DATp' and DATn' applied to the first data line Dj and the second data line D(j+1) are changed into the voltage of the high gray, so the positive data voltage Vp' input to the pixel electrode PE may be changed by the influence of the first parasitic capacitor Cdp1 and the second parasitic capacitor Cdp2. Since the parasitic capacitance of the first parasitic capacitor Cdp1 is larger than the parasitic capacitance of the second parasitic capacitor Cdp2, the positive data voltage Vp' input to the pixel electrode PE is more affected by the first parasitic capacitor Cdp1, and the positive data voltage Vp' input to the pixel electrode PE may be changed into the higher gray voltage. Without correction or compensation, the pixel PX emits with the luminance Lp' that is higher than a target luminance TLp, such that vertical crosstalk may occur.

If the negative data voltage Vn' of the low gray is input to the pixel electrode PE of the pixel PX, the negative data voltage DATn' applied to the first data line Dj during one frame is changed from the low gray to the high gray, so the positive data voltage DATp' applied to the second data line D(j+1) is changed from the low gray to the high gray, and the pixel PX emits with the luminance Ln' that is higher than the target luminance TLn. Without correction or compensation, the vertical crosstalk may occur.

Again referring to FIG. 5, the first sensing electrode 111 and the second sensing electrode 112 are biased in the left direction as the pixel electrode PE is biased. Accordingly, the first electrode distance da increases, and the second electrode distance db decreases, such that the overlapping region of the first extending portion 111b of the first sensing electrode 111 and the third extending portion 113b of the third sensing electrode 113 decreases, and the overlapping region of the second extending portion 112b of the second sensing electrode 112 and the third extending portion 113b of the third sensing electrode 113 increases. The capacitance of the second sensing capacitor Cdpb is larger than the capacitance of the first sensing capacitor Cdpa.

The power supply unit 320 blocks the electrical connection with the third sensing electrode 113 using an internal switch or the like, thereby making the third sensing electrode 113 float. When the third sensing electrode 113 is in the floating state, the power supply unit 320 may apply the first reference voltage V1 to the first sensing electrode 111 through the first signal wire SL1 and may apply the second reference voltage V2 to the second sensing electrode 112 through the second signal wire SL2. The second reference voltage V2 may be a ground voltage, and the first reference voltage V1 may be a voltage that is higher than the second reference voltage V2 by a predetermined magnitude.

A voltage between the first reference voltage V1 and the second reference voltage V2 may be formed in the third sensing electrode 113 by the coupling of the first sensing capacitor Cdpa and the coupling of the second sensing capacitor Cdpb. The voltage formed in the third sensing electrode 113 becomes closer to the first reference voltage V1 as the first sensing capacitor Cdpa increases and becomes closer to the second reference voltage V2 as the second sensing capacitor Cdpb increases. The voltage formed in the third sensing electrode 113 becomes closer to the second reference voltage V2 as the first electrode distance da increases and becomes closer to the first reference voltage V1 as the second electrode distance db increases.

In FIG. 5, since the capacitance of the second sensing capacitor Cdpb is larger than the capacitance of the first sensing capacitor Cdpa, and the first electrode distance da is larger than the second electrode distance db, the voltage formed in the third sensing electrode 113 becomes closer to the second reference voltage V2. The voltage formed in the third sensing electrode 113 may be lower than a middle voltage of the first reference voltage V1 and the second reference voltage V2 and may be higher than the second reference voltage V2.

The power supply unit 320 may receive the voltage formed on the third sensing electrode 113 through the third signal wire SL3 as a measuring voltage, and infers and measures the capacitance of the first sensing capacitor Cdpb and the second sensing capacitor Cdpb from the voltage value of the measuring voltage. Since the capacitance of the first sensing capacitor Cdpa corresponds to the capacitance of the second parasitic capacitor Cdp2 and since the capacitance of the second sensing capacitor Cdpb corresponds to the capacitance of the first parasitic capacitor Cdp1, the power supply unit 320 may be able to determine the capacitance of the first parasitic capacitor Cdp1 and the second parasitic capacitor Cdp2. The power supply unit 320 stores the measured capacitance of the first parasitic capacitor Cdp1 and the second parasitic capacitor Cdp2 to the memory 210. The process in which the power supply unit 320 stores the measured capacitance of the first parasitic capacitor Cdp1 and the second parasitic capacitor Cdp2 to the memory 210 may be performed during the manufacturing process of the display device or an initial operation of the display device.

The signal controller 310 reads the value of the capacitance of the first parasitic capacitor Cdp1 and the second parasitic capacitor Cdp2 stored in the memory 210 and corrects the image signal so as to generate an image data signal that compensate the parasitic capacitance error.

Referring to FIG. 6, when the capacitance of the first parasitic capacitor Cdp1 is larger than the capacitance of the second parasitic capacitor Cdp2 (and when the capacitance of the second sensing capacitor Cdpb is larger than the capacitance of the first sensing capacitor Cdpa), the signal controller 310 may correct the image signal so that the data voltage of the low gray becomes the voltage of the lower gray. The positive data voltage DATp of the low gray applied to the first data line Dj is generated as the voltage of the gray that is lower than the pre-correction positive data voltage DATp' of the low gray. The positive data voltage Vp of the low gray input to the pixel electrode PE is lower than the pre-correction positive data voltage Vp' of the low gray. When the positive data voltage DATp applied to the first data line Dj during one frame is changed from the low gray to the high gray and the negative data voltage DATn applied to the second data line D(j+1) is changed from the low gray to the high gray, the positive data voltage Vp (less than Vp') is input to the pixel electrode PE, such that the pixel PX emits with the target luminance TLp, and vertical crosstalk is minimized or prevented.

Likewise, the negative data voltage DATn of the low gray applied to the first data line Dj is generated as the voltage of the gray lower than the pre-correction negative data voltage DATn' of the gray. The negative data voltage Vn of the low gray input to the pixel electrode PE becomes higher (i.e., less negative) than the pre-correction negative data voltage Vn' of the low gray. Accordingly, when the negative data voltage DATn applied to the first data line Dj during one frame is changed from the low gray to the high gray and the positive data voltage DATp applied to the second data line D(j+1) is changed from the low gray to the high gray, the pixel PX receives the negative data voltage Vn (less negative than Vn') of the low gray and emits with the target luminance TLn, and vertical crosstalk is minimized or prevented.

Figure 7:
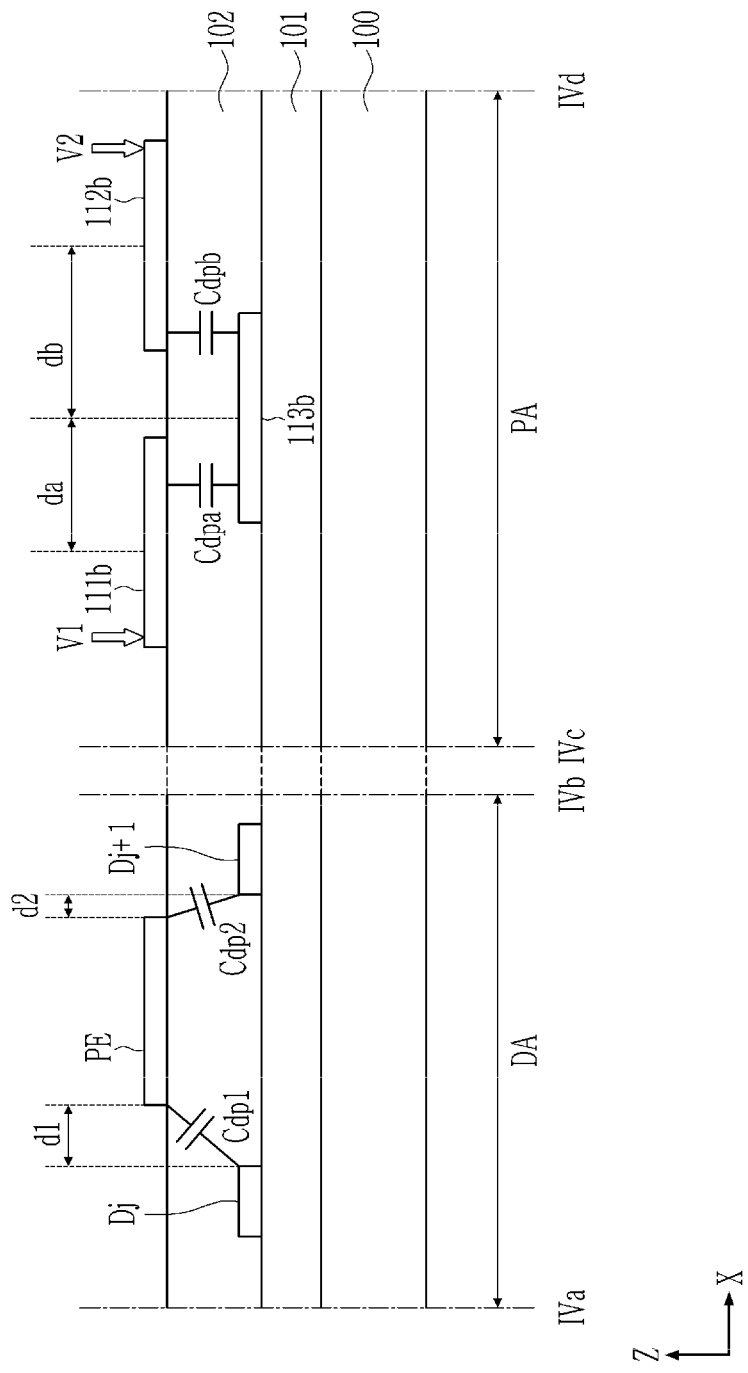
FIG. 7 is a view showing another example of an alignment error of a pixel electrode and a data line according to an embodiment.
Figure 8:
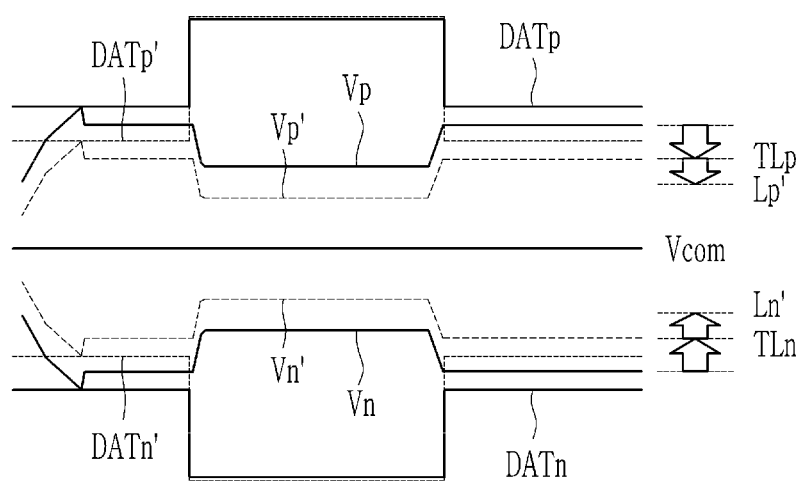
FIG. 8 is a view showing a method for compensating an alignment error of a pixel electrode and a data line of FIG. 7 according to an embodiment.

FIG. 7 is a view showing another example of an alignment error of a pixel electrode and a data line according to an embodiment. FIG. 8 is a view showing a method for compensating an alignment error of a pixel electrode and a data line according to an embodiment.

FIG. 7 shows that the pixel electrode PE is disposed closer to the second data line D(j+1) than the first data line Dj. Compared with the corresponding distances shown in FIG. 4, the first separation distance d1 increases, and the second separation distance d2 decreases. The second separation distance d2 is smaller than the first separation distance d1. Thus, the parasitic capacitance of the second parasitic capacitor Cdp2 is greater than the parasitic capacitance of the first parasitic capacitor Cdp1.

With the state of this alignment error, referring to FIG. 8, when the data voltages DATp' and DATn' applied to the first data line Dj and the second data line D(j+1) are changed into the voltage of the high gray, the positive data voltage Vp' of the low gray input to the pixel electrode PE of one pixel PX is more affected by the second parasitic capacitor Cdp2 such that it may be changed into the voltage of the lower gray. Without correction or compensation, the pixel PX emits with the luminance Lp' that is lower than the target luminance TLp, such that unwanted vertical crosstalk may occur.

Likewise, if the negative data voltage Vn' of the low gray is input to the pixel electrode PE of the pixel PX, the negative data voltage DATn' applied to the first data line Dj during one frame is changed from the low gray to the high gray, the positive data voltage DATp' applied to the second data line D(j+1) is changed from the low gray to the high gray, and the pixel PX emits with a magnitude of the luminance Ln' that is lower than the target luminance TLn, such that unwanted vertical crosstalk may occur.

Again referring to FIG. 7, the first sensing electrode 111 and the second sensing electrode 112 are biased in the right direction as the pixel electrode PE is biased. Accordingly, the first electrode distance da decreases, and the second electrode distance db increases, such that the overlapping region of the first extending portion 111b of the first sensing electrode 111 and the third extending portion 113b of the third sensing electrode 113 increases, and the overlapping region of the second extending portion 112b of the second sensing electrode 112 and the third extending portion 113b of the third sensing electrode 113 decreases. The capacitance of the first sensing capacitor Cdpa becomes larger than the capacitance of the second sensing capacitor Cdpb.

Since the capacitance of the first sensing capacitor Cdpa is larger than the capacitance of the second sensing capacitor Cdpb and the first electrode distance da is smaller than the second electrode distance db, the voltage formed in the third sensing electrode 113 becomes closer to the first reference voltage V1. The voltage formed in the third sensing electrode 113 may be higher than the middle voltage of the first reference voltage V1 and the second reference voltage V2 and may be lower than the first reference voltage V1.

The power supply unit 320 may receive the voltage formed on the third sensing electrode 113 as the measuring voltage through the third signal wire SL3, and may store the measured capacitance of the first parasitic capacitor Cdp1 and the second parasitic capacitor Cdp2 to the memory 210.

Referring to FIG. 8, when the capacitance of the second parasitic capacitor Cdp2 is larger than the capacitance of the first parasitic capacitor Cdp1 (and when the capacitance of the first sensing capacitor Cdpa is larger than the capacitance of the second sensing capacitor Cdpb), the signal controller 310 may correct the image signal so that the data voltage of the low gray becomes the voltage of the higher gray. The positive data voltage DATp of the low gray applied to the first data line Dj is generated as the voltage of the gray that is higher than the pre-correction positive data voltage DATp' of the low gray. The positive data voltage Vp of the low gray input to the pixel electrode PE is higher than the pre-correction positive data voltage Vp' of the low gray. When the positive data voltage DATp applied to the first data line Dj during one frame is changed from the low gray to the high gray and the negative data voltage DATn applied to the second data line D(j+1) is changed from the low gray to the high gray, the positive data voltage Vp (greater than Vp') is input to the pixel electrode PE, such that the pixel PX emits with the target luminance TLp, and unwanted vertical crosstalk is minimized or prevented.

Likewise, the negative data voltage DATn of the low gray applied to the first data line Dj is generated as the voltage of the gray that is higher than the pre-correction negative data voltage DATn' of the low gray. The negative data voltage Vn of the low gray input to the pixel electrode PE is lower (i.e., more negative) than the pre-correction negative data voltage Vn' of the low gray. Accordingly, if the negative data voltage DATn applied to the first data line Dj during one frame is changed from the low gray to the high gray and the positive data voltage DATp applied to the second data line D(j+1) is changed from the low gray to the high gray, the pixel PX to which the negative data voltage Vn of the low gray is input emits with the target luminance TLn, and vertical crosstalk is minimized or prevented.

Figure 9:
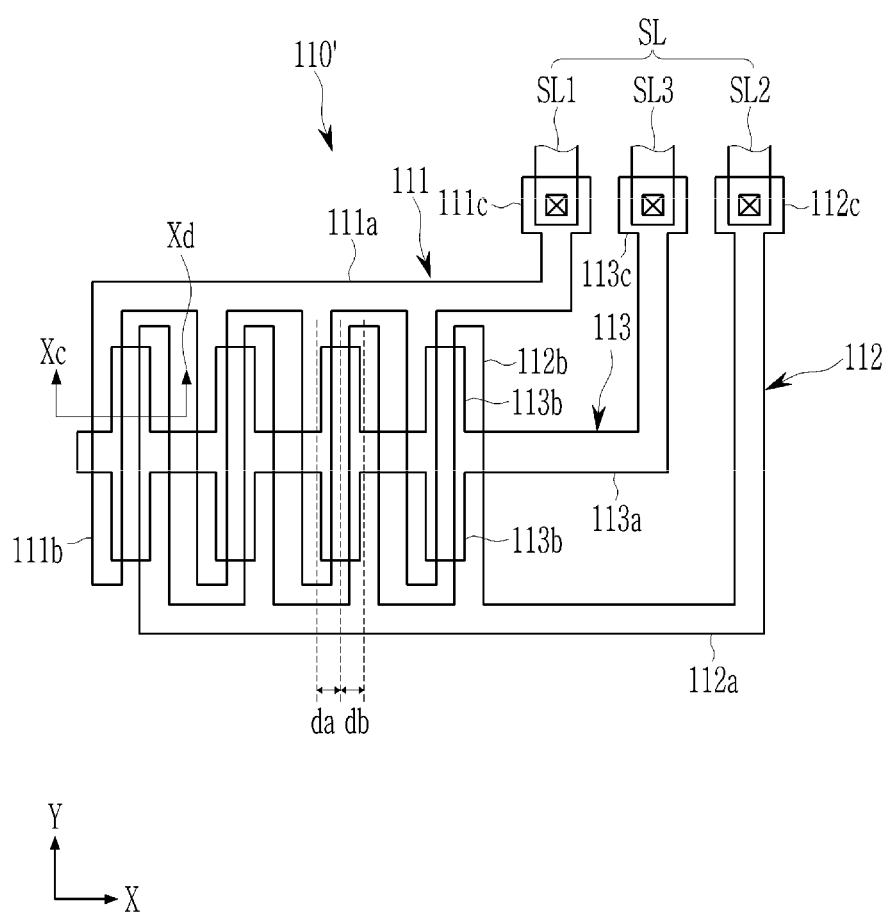
FIG. 9 is a layout view showing a panel sensor according to an embodiment.
Figure 10:
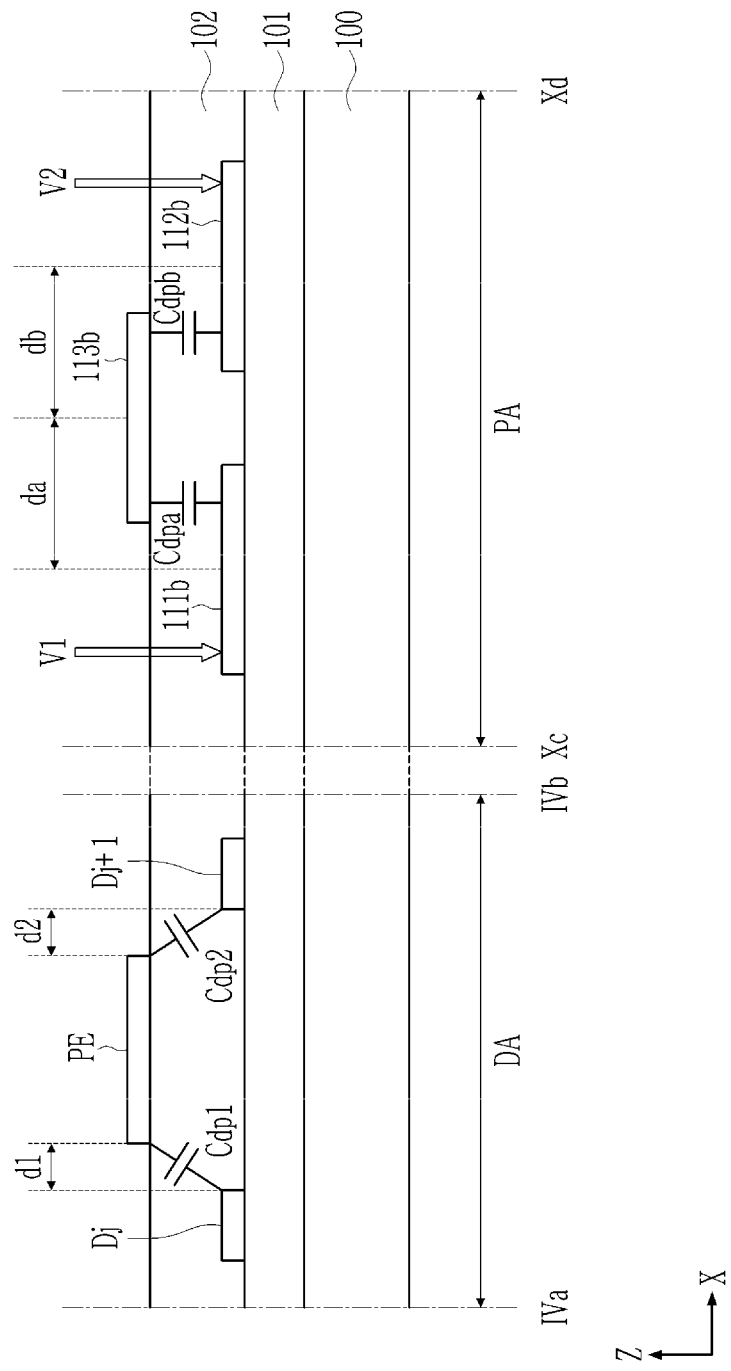
FIG. 10 is a cross-sectional view taken along lines IVa-IVb of FIG. 2 and Xc-Xd of FIG. 9 according to an embodiment.

FIG. 9 is a layout view showing a panel sensor according to another embodiment. FIG. 10 is a cross-sectional view taken along lines IVa-IVb of FIG. 2 and Xc-Xd of FIG. 9. Some features associated with FIG. 9 and FIG. 10 may be identical to or analogous to features described with reference to FIG. 3 and FIG. 4.

Referring to FIG. 9 and FIG. 10, a panel sensor 110' includes a first sensing electrode 111, a second sensing electrode 112, and a third sensing electrode 113.

The first extending portion 111b of the first sensing electrode 111 and the second extending portion 112b of the second sensing electrode 112 are disposed between the first insulating layer 101 and the second insulating layer 102, and the third extending portion 113b of the third sensing electrode 113 may be disposed on the second insulating layer 102. The first sensing electrode 111 and the second sensing electrode 112 may be disposed on the same layer as the data lines Dj and D(j+1), and the third sensing electrode 113 may be disposed on the same layer as the pixel electrode PE. When the data lines Dj and D(j+1) are formed in the display area DA, the first sensing electrode 111 and the second sensing electrode 112 are formed in the peripheral area PA. When the pixel electrode PE is formed in the display area DA, the third sensing electrode 113 is formed in the peripheral area PA.

As the first sensing electrode 111 and the second sensing electrode 112 are formed along with the data lines Dj and D(j+1) and as the third sensing electrode 113 is formed along with the pixel electrode PE, the ratio of the first electrode distance da and the second electrode distance db may correspond to (e.g., equal to) the ratio of the first separation distance d1 and the second separation distance d2. The first electrode distance da may correspond to the first separation distance d1, and the second electrode distance db may correspond to the second separation distance d2.

As the first sensing electrode 111 and the second sensing electrode 112 are formed along with the data lines Dj and D(j+1) and as the third sensing electrode 113 is formed along with the pixel electrode PE, the capacitance ratio of the first sensing capacitor Cdpa and the second sensing capacitor Cdpb may correspond to the capacitance ratio of the first parasitic capacitor Cdp1 and the second parasitic capacitor Cdp2. The capacitance of the first sensing capacitor Cdpa may correspond to the capacitance of the first parasitic capacitor Cdp1, and the capacitance of the second sensing capacitor Cdpb may correspond to the capacitance of the second parasitic capacitor Cdp2.

Except for some differences, features described with reference to one or more of FIG. 3, FIG. 4, FIG. 5, FIG. 6, FIG. 7, and FIG. 8 may all be substantially or analogously applied to one or more of FIG. 9, FIG. 10, FIG. 11, and FIG. 12.

Figure 11:
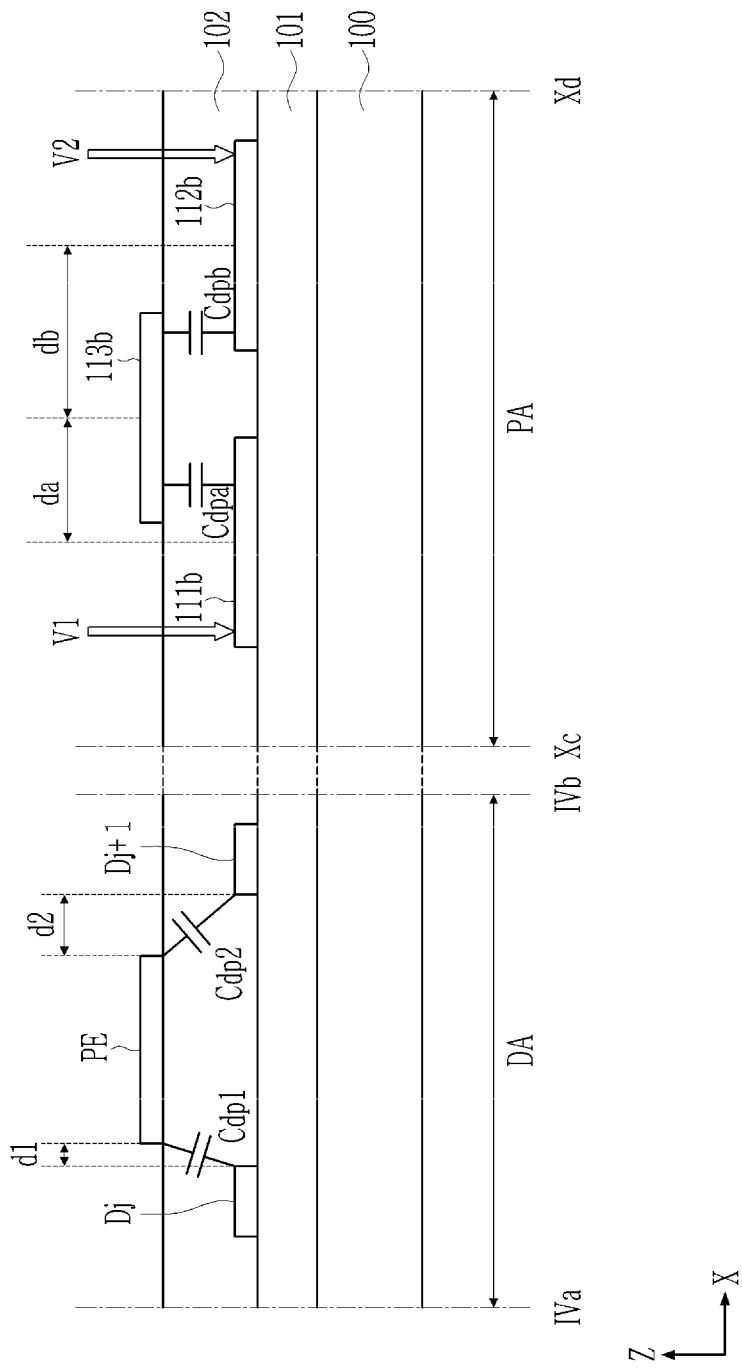
FIG. 11 is a view showing an example of an alignment error of a pixel electrode and a data line according to an embodiment.

FIG. 11 is a view showing an example of an alignment error of a pixel electrode and a data line according to an embodiment.

FIG. 11 shows that the pixel electrode PE is closer to the first data line Dj than the second data line D(j+1).

The third sensing electrode 113 is biased in the left direction as the pixel electrode PE is biased. Accordingly, the first electrode distance da decreases, the second electrode distance db increases, the overlapping region of the first extending portion 111b of the first sensing electrode 111 and the third extending portion 113b of the third sensing electrode 113 increases, and the overlapping region of the second extending portion 112b of the second sensing electrode 112 and the third extending portion 113b of the third sensing electrode 113 decreases. The capacitance of the first sensing capacitor Cdpa becomes larger than the capacitance of the second sensing capacitor Cdpb.

If the first reference voltage V1 is applied to the first sensing electrode 111 and the second reference voltage V2 is applied to the second sensing electrode 112, since the capacitance of the first sensing capacitor Cdpa is larger than the capacitance of the second sensing capacitor Cdpb and the second electrode distance db is larger than the first electrode distance da, a voltage that is closer to the first reference voltage V1 is formed in the third sensing electrode 113. The voltage formed in the third sensing electrode 113 may be higher than the middle voltage of the first reference voltage V1 and the second reference voltage V2, and may be lower than the first reference voltage V1.

Referring to FIG. 6, the signal controller 310 generates the positive data voltage DATp of the low gray applied to the first data line Dj as the voltage of the gray that is lower than the pre-correction positive data voltage DATp' of the low gray so as to prevent or minimize vertical crosstalk. The signal controller 310 generates the negative data voltage DATn of the low gray applied to the first data line Dj as the voltage of the gray that is lower (less negative) than the pre-correction negative data voltage DATn' of the low gray so as to prevent or minimize vertical crosstalk.

Except for some differences, features described with reference to FIG. 5 and FIG. 6 may be substantially or analogously applied to FIG. 11.

Figure 12:
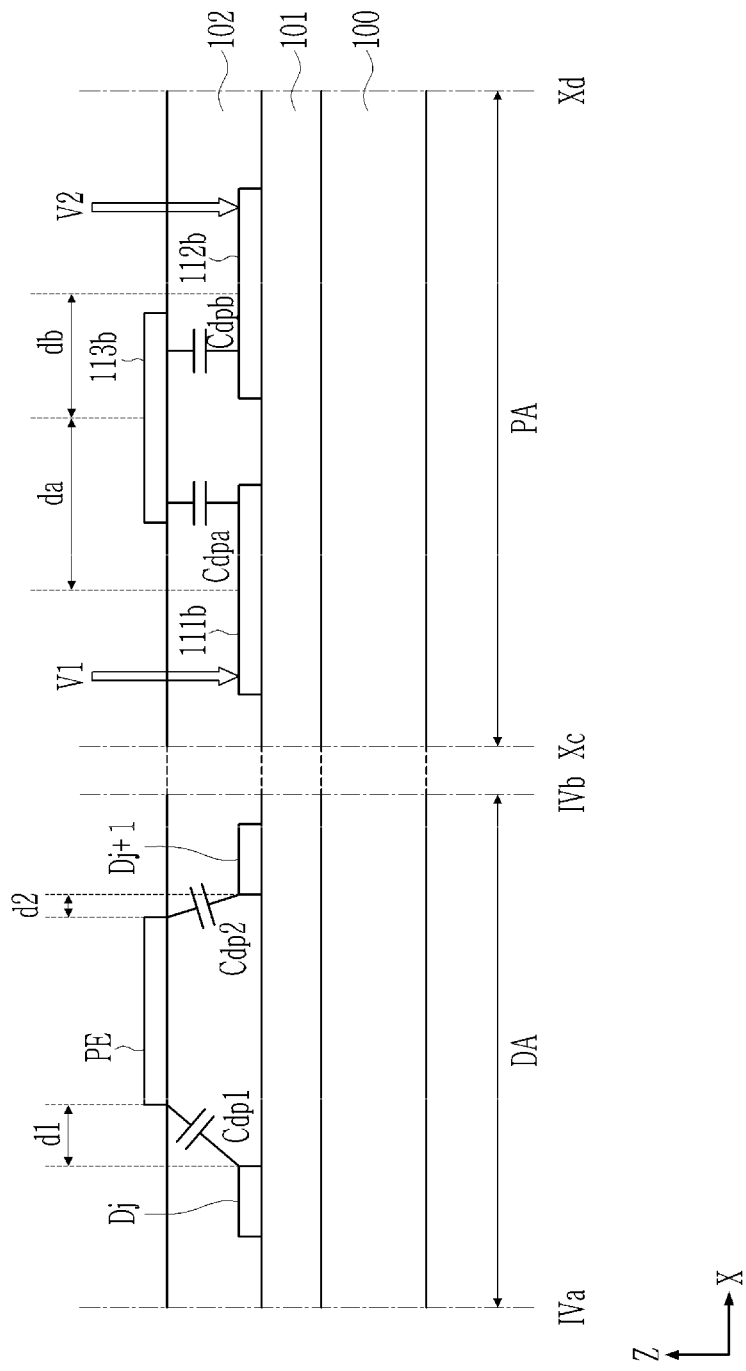
FIG. 12 is a view showing another example of an alignment error of a pixel electrode and a data line according to an embodiment.

FIG. 12 is a view showing another example of an alignment error of a pixel electrode and a data line according to an embodiment.

FIG. 12 shows that the pixel electrode PE is disposed closer to the second data line D(j+1) than the first data line Dj.

The third sensing electrode 113 is biased in the right direction as the pixel electrode PE is biased. Accordingly, the first electrode distance da increases, the second electrode distance db decreases, the overlapping region of the first extending portion 111b of the first sensing electrode 111 and the third extending portion 113b of the third sensing electrode 113 decreases, and the overlapping region of the second extending portion 112b of the second sensing electrode 112 and the third extending portion 113b of the third sensing electrode 113 increases. The capacitance of the second sensing capacitor Cdpb is larger than the capacitance of the first sensing capacitor Cdpa.

If the first reference voltage V1 is applied to the first sensing electrode 111 and the second reference voltage V2 is applied to the second sensing electrode 112, since the capacitance of the second sensing capacitor Cdpb is larger than the capacitance of the first sensing capacitor Cdpa and the first electrode distance da is larger than the second electrode distance db, a voltage that is closer to the second reference voltage V2 is formed in the third sensing electrode 113. The voltage formed in the third sensing electrode 113 may be lower than the middle voltage of the first reference voltage V1 and the second reference voltage V2 and may be higher than the second reference voltage V2.

Referring to FIG. 8, the signal controller 310 generates the positive data voltage DATp of the low gray applied to the first data line Dj as the voltage of the gray that is higher than the pre-correction positive data voltage DATp' of the low gray pre-correction so as to prevent or minimize vertical crosstalk. The signal controller 310 generates the negative data voltage DATn of the low gray applied to the first data line Dj as the voltage of the gray that is higher (more negative) than the pre-correction negative data voltage DATn' of the low gray so as to minimize or prevent vertical crosstalk.

Except for some differences, features described with reference to FIG. 7 and FIG. 8 may be substantially or analogously applied to FIG. 12.

Figure 13:
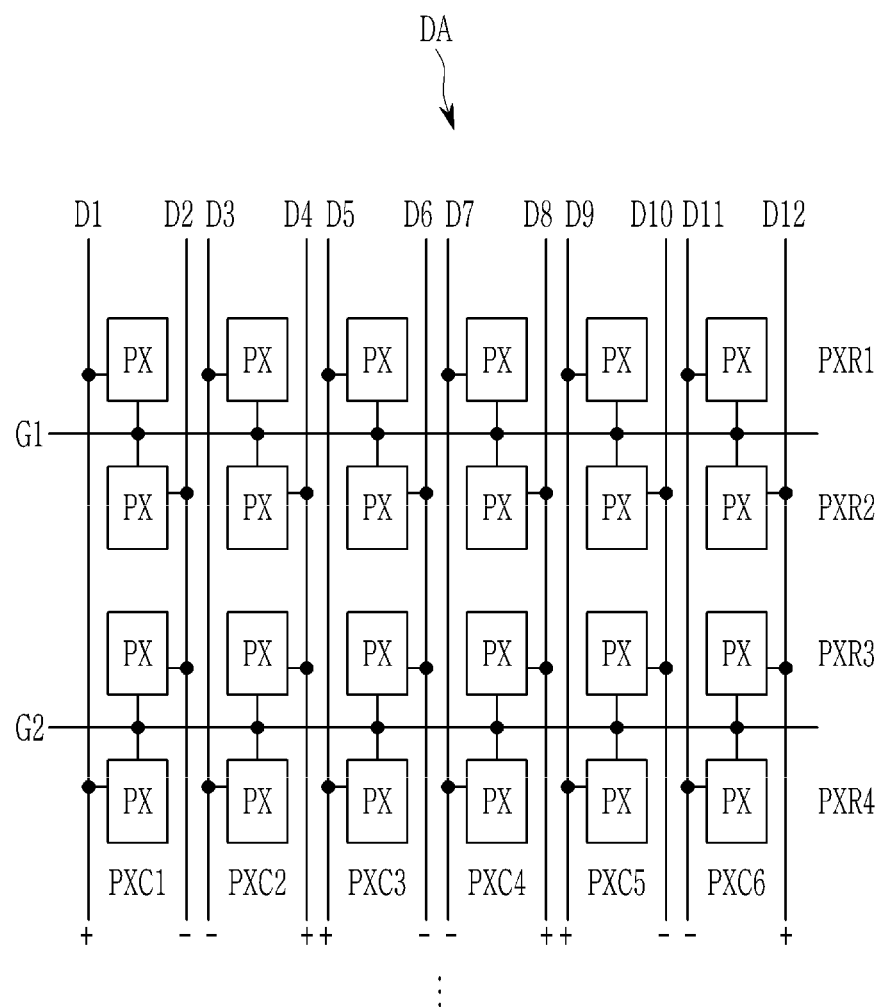
FIG. 13 is a layout view showing a display area according to an embodiment.

FIG. 13 is a layout view showing a display area according to an embodiment.

Referring to FIG. 13, the display area DA may include a plurality of pixels PX, a plurality of gate lines G1 and G2 connected to the plurality of pixels PX, and a plurality of data lines D1, D2, D3, D4, D5, D6, D7, D8, D9, D10, D11, and D12 connected to the plurality of pixels PX.

The plurality of pixels PX may be arranged in the first direction X and the second direction Y. Each of the pixels PX may include a pixel electrode PE and a switching transistor T1 described in FIG. 2.

The plurality of gate lines G1 and G2 may extend in the first direction X, and one may be disposed per two pixel rows. For example, the first gate line G1 may extend in the first direction X between the first pixel row PXR1 and the second pixel row PXR2 to be connected to the pixels PX of the first pixel row PXR1 and the pixels PX of the second pixel row PXR2. The second gate line G2 may extend in the first direction X between the third pixel row PXR3 and the fourth pixel row PXR4 to be connected to the pixels PX of the third pixel row PXR3 and the pixels PX of the fourth pixel row PXR4. The number of gate lines G1 and G2 is a half the number of the pixel rows PXR1 to PXR4.

The plurality of data lines D1-D12 may extend in the second direction Y, and two may be disposed per pixel column. A number of the data lines D1-D12 is twice the number of the pixel columns PXC1, PXC2, PXC3, PXC4, PXC5, and PXC6. Two data lines may be disposed between immediately adjacent pixel columns, the data voltage of the same polarity is applied to the two data lines disposed between the adjacent pixel columns, and the data voltage of the different polarities may be applied to the data lines of opposite sides of each of the pixel columns PXC1-PXC6. For example, the data voltage of the positive polarity may be applied to the first data line D1 disposed at the left side of the first pixel column PXC1, and the data voltage of the negative polarity may be applied to the second data line D2 disposed at the right side of the first pixel column PXC1. The data voltage of the negative polarity may be applied to each of the second data line D2 and the third data line D3 disposed between the first pixel column PXC1 and the second pixel column PXC2. The data voltage of the positive polarity may be applied to each of the fourth data line D4 and the fifth data line D5 disposed between the second pixel column PXC2 and the third pixel column PXC3. Thus, a plurality of data voltages applied from the first data line D1 to the twelfth data line D12 may have the polarity that repeats in the order of positive (+), negative (−), negative (−), and positive(+).

The polarity of the data voltage applied to the plurality of data lines D1-D12 may be reversed for a frame unit. For example, in the first frame, data voltages having the polarity shown in FIG. 13 is applied to the plurality of data lines D1-D12; the plurality of data voltages applied to the data lines D1-D12 in the following second frame may have the polarity pattern in the order of negative (−), positive (+), positive (+), and negative (−).

Each of the pixels PX may be connected to one of the two immediately adjacent data lines. In each of the pixel rows PXR1-PXR4, the connection direction between the plurality of pixels PX and the plurality of data lines D1-D12 may be changed with a predetermined pixel column interval. The connection directions between the plurality of pixels PX and the plurality of data lines D1-D12 may be opposite for the odd-numbered pixel rows PXR1 and PXR3, and the connection direction between the plurality of pixels PX and the plurality of data lines D1-D12 may be opposite for the even-numbered pixel rows PXR2 and PXR4. The plurality of pixels PX of the odd-numbered pixel row and the plurality of pixels PX connected to the immediately neighboring even-numbered pixel row, which are connected to a same gate line, may be connected to the plurality of data lines D1-D12 in the different directions.

The pixels PX disposed in the first pixel row PXR1 and the fourth pixel row PXR4 are connected to the data lines D1, D3, D5, D7, D9, and D11 adjacent at the left side. The pixels PX disposed in the second pixel row PXR2 and the third pixel row PXR3 are connected to the data lines D2, D4, D6, D8, D10, and D12 adjacent at the right side. The connected data line of the plurality of pixels PX disposed at the first pixel row PXR1 and the fourth pixel row PXR4 is the odd-numbered data lines D1, D3, D5, D7, D9, and D11, and the unconnected data line is the even-numbered data lines D2, D4, D6, D8, D10, and D12. The connected data lines of the plurality of pixels PX disposed in the second pixel row PXR2 and the third pixel row PXR3 is the even-numbered data lines D2, D4, D6, D8, D10, and D12, and the unconnected data lines is the odd-numbered data lines D1, D3, D5, D7, D9, and D11.

FIG. 13 shows a part of the display area DA. A number of the pixels, the gate lines, and the data lines included in the display area DA may be configured according to embodiments.

Figure 14:
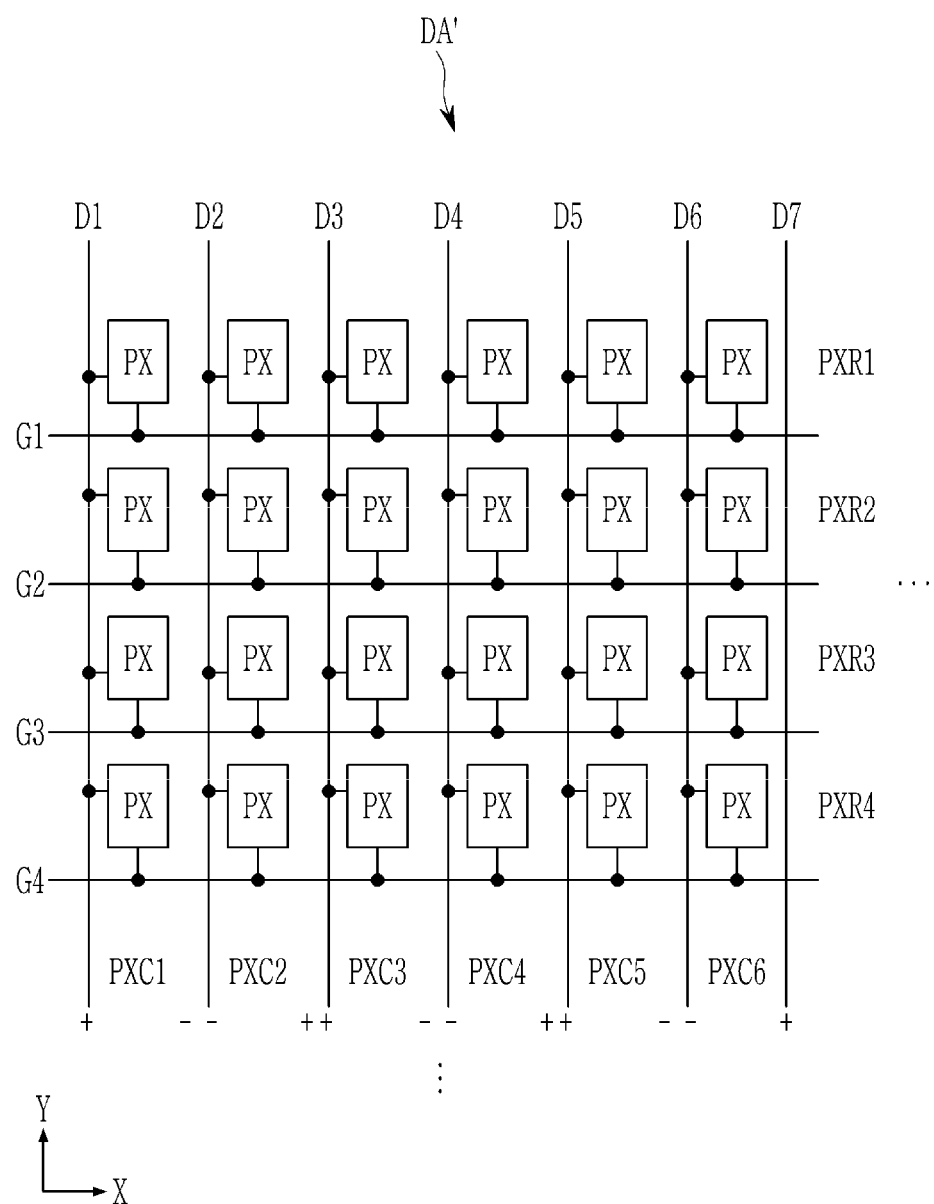
FIG. 14 is a layout view showing a display area according to an embodiment.

FIG. 14 is a layout view showing a display area according to another embodiment.

Referring to FIG. 14, the display area DA' may include a plurality of pixels PX, a plurality of gate lines G1-G4 connected to the plurality of pixels PX, and a plurality of data lines D1-D7 connected to the plurality of pixels PX.

The plurality of pixels PX may be arranged in the first direction X and the second direction Y. Each of the plurality of pixels PX may include a pixel electrode PE and a switching transistor T1 described in FIG. 2.

A plurality of gate lines G1-G4 extend in the first direction X, and one may be disposed per pixel row. The plurality of data lines D1-D7 extend in the second direction Y, and one may be disposed per pixel column. Data voltages of different polarities may be applied to the odd-numbered data lines D1, D3, D5, and D7 and the even-numbered data lines D2, D4, and D6. For example, in the first frame, the data voltage of the positive polarity may be applied to the odd-numbered data lines D1, D3, D5, and D7, and the data voltage of the negative polarity may be applied to the even-numbered data lines D2, D4, and D6. In the following second frame, the data voltage of the negative polarity may be applied to the odd-numbered data lines D1, D3, D5, and D7, and the data voltage of the positive polarity may be applied to the even-numbered data lines D2, D4, and D6.

The pixels PX may be connected to the data lines disposed at the left side, the data lines adjacent to the left side of the pixel PX may be the connected data lines, and the data lines adjacent at the right side of the pixel PX may be the unconnected data lines.

FIG. 14 shows a part of the display area DA'. A number of the pixels, the gate lines, and the data lines included in the display area DA' may be configured according to embodiments.

Figure 15:
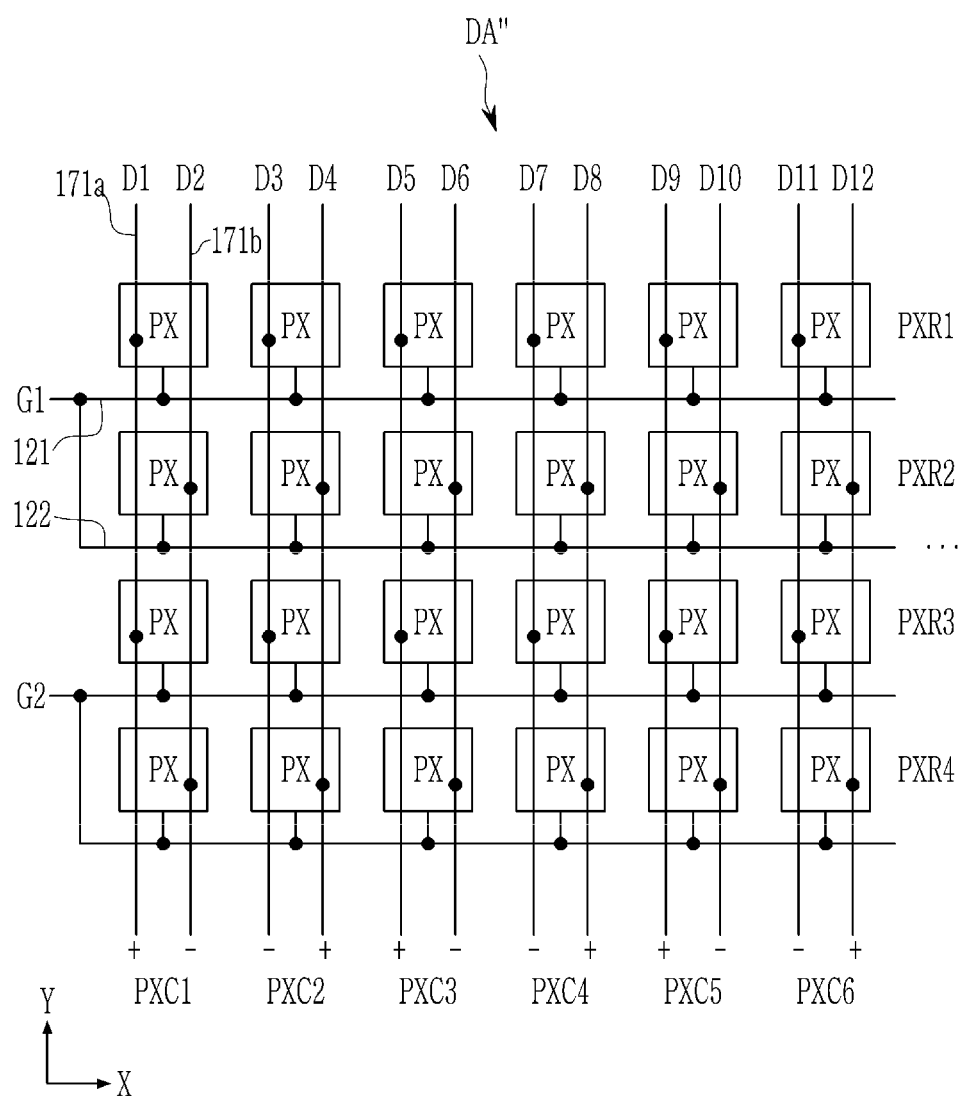
FIG. 15 is a layout view showing a display area according to an embodiment.

FIG. 15 is a layout view showing a display area according to another embodiment.

Referring to FIG. 15, the display area DA" includes a plurality of pixels PX, a plurality of gate lines G1 and G2, and a plurality of data lines D1-D12.

Each of the gate lines G1 and G2 may include a pair of gate lines 121 and 122 electrically connected to each other. The pair of gate lines 121 and 122 may extend in the first direction X. The pair of gate lines 121 and 122 may be parallel to each other in the display area DA. Each of the gate lines 121 and 122 corresponds to one of the pixel rows and may be electrically connected to the pixels PX included in the corresponding pixel row. A gate line 121 and a gate line 122 included in each gate line G1 or G2 are physically and electrically connected to each other near the left/right edge of the display area DA" or in the peripheral area PA, thereby transmitting the same gate signal.

Each of data lines D1-D12 may include a pair of a first data line 171a and a second data line 171b overlapping the pixels PX included in the corresponding pixel column among a plurality of pixel columns PXC1-PXC6. The pair of the first data line 171a and the second data line 171b may correspond to one pixel column, and may cross and overlap the pixel electrodes of the pixels PX included in the corresponding pixel column. Particularly, the pair of the first data line 171a and the second data line 171b may pass the light transmitting region at each pixel PX in the corresponding pixel column. The pair of the first data line 171a and the second data line 171b corresponding to one pixel column may transmit different data voltages. The pair of the first data line 171a and the second data line 171b corresponding to one pixel column may transmit data voltages of different polarities.

Each of the plurality of pixels PX may be connected to one of the overlapping first data line 171a and the overlapping second data line 171b. For example, the pixels PX disposed in the odd-numbered pixel rows PXR1 and PXR3 may be connected to the first data lines 171a, and the pixels PX disposed in the even-numbered pixel rows PXR2 and PXR4 may be connected to the second data lines 171b. The connected data line of the plurality of pixels PX disposed in the odd-numbered pixel rows PXR1 and PXR3 may be first data lines 171a, and the unconnected data line may be second data lines 171b. The connected data line of the plurality of pixels PX disposed in the even-numbered pixel rows PXR2 and PXR4 may be second data lines 171b, and the unconnected data line may be first data line 171a.

FIG. 15 shows the part of the display area DA". The number of the pixels, the gate lines, and the data lines included in the display area DA" may be configured according to embodiments.

Except for some differences, features described with reference to FIG. 13 may be substantially or analogously applied to FIG. 15.

Figure 16:
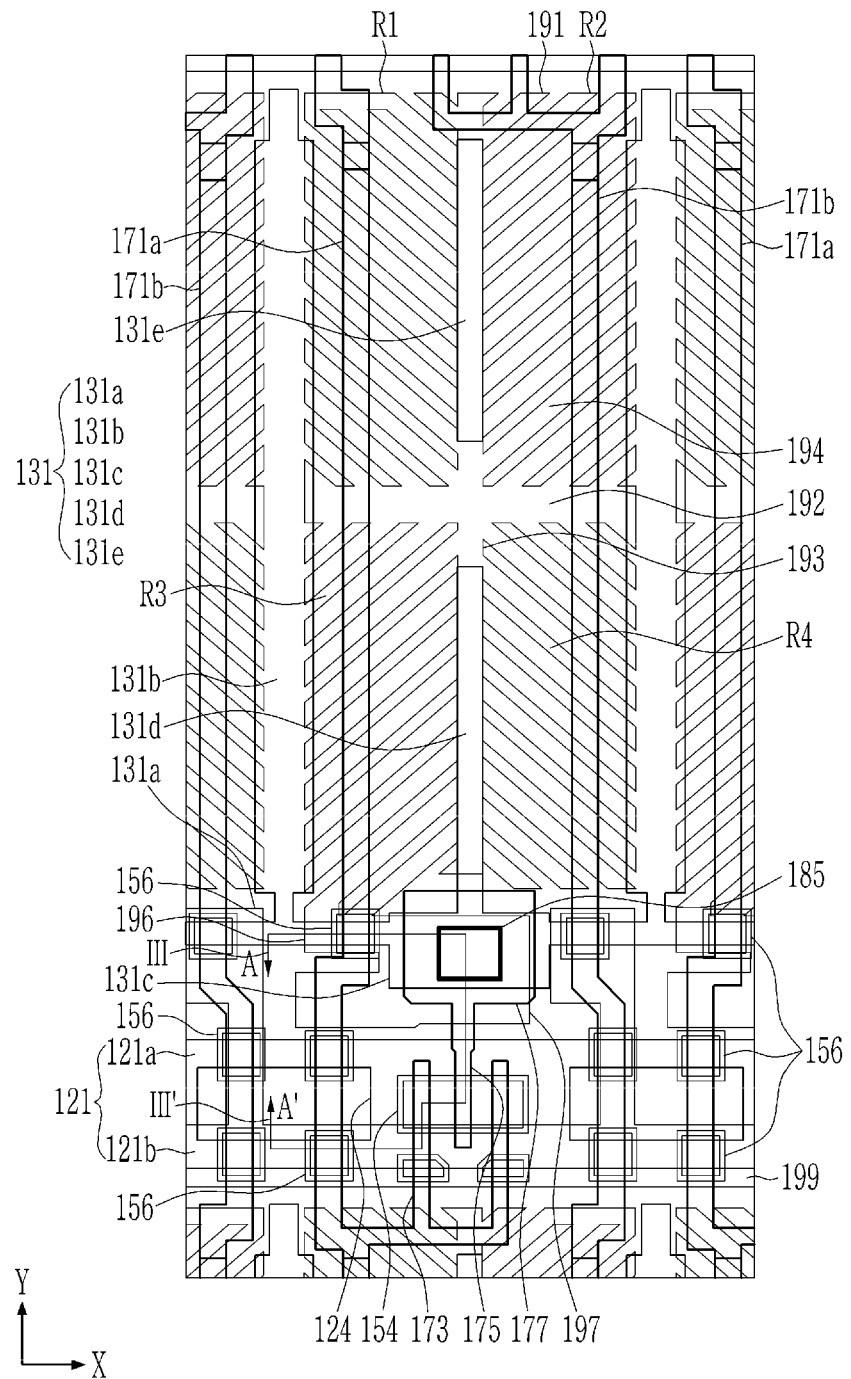
FIG. 16 is a top plan view showing one pixel of a display device according to an embodiment.
Figure 17:
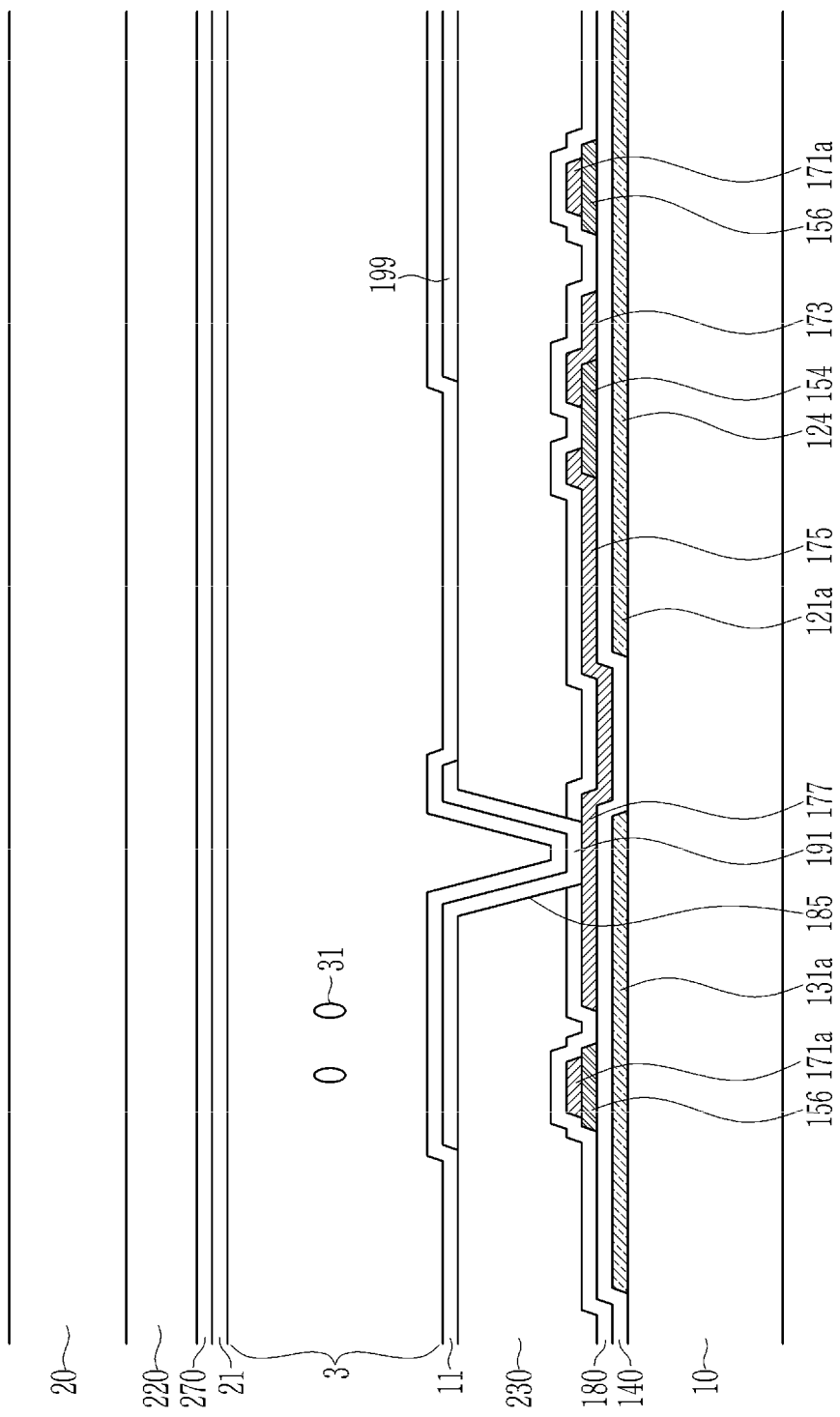
FIG. 17 is a cross-sectional view taken along a line A-A' of FIG. 16 according to an embodiment.

FIG. 16 is a top plan view showing one pixel of a display device according to an embodiment. FIG. 17 is a cross-sectional view taken along a line A-A' of FIG. 16. In FIG. 16 and FIG. 17, a pixel PX connected to one gate line 121 of FIG. 15 will be described as an example.

Referring to FIG. 16 and FIG. 17, the display device includes a first substrate 10 and a second substrate 20 facing each other, and a liquid crystal layer 3 disposed between the first substrate 10 and the second substrate 20.

First, the first substrate 10 is described.

A gate conductive layer including a gate line 121, a gate electrode 124, and a storage electrode line 131 is disposed on the first substrate 10. The gate conductive layer may be formed of at least one selected from metals such as copper (Cu), aluminum (Al), magnesium (Mg), silver (Ag), gold (Au), platinum (Pt), palladium (Pd), nickel (Ni), neodymium (Nd), iridium (Ir), molybdenum (Mo), tungsten (W), titanium (Ti), chromium (Cr), tantalum (Ta), and an alloy.

The gate line 121 may include a plurality of gate lines 121a and 121b, and may further include a gate electrode 124. The gate line 121 extends along the first direction X, and may include the two gate lines 121a and 121b. The two gate lines 121a and 121b extend in parallel in a first direction X, and may be connected to each other to surround the gate electrode 124.

The storage electrode line 131 is separated from the gate line 121 and the gate electrode 124, and may transmit a predetermined voltage such as a common voltage. The storage electrode line 131 is disposed on the first substrate 10, is formed on the same layer as the gate line 121, and is formed of the same material as the gate line 121.

The storage electrode line 131 may include one transverse part 131a extending in the first direction X, a plurality of longitudinal parts 131b and 131d connected to the transverse part 131a and extending in the second direction Y, and an expansion part 131c which is a part of the transverse part 131a that is expanded.

The plurality of longitudinal parts 131b and 131d may include two longitudinal parts 131b disposed on respective sides of the pixel electrode 191, and one longitudinal part 131d extending upward in the second direction Y from the expansion part 131c.

The storage electrode line 131 may further include a floating storage electrode 131e that is separated on the upper side of one longitudinal part 131d and disposed in the first direction X.

The storage electrode line 131 may be disposed at the upper side of the gate line 121, and may overlap the edge of the pixel electrode 191. This is described in detail after describing the pixel electrode 191.

A gate insulating layer 140 is disposed on the gate conductive layer. The gate insulating film 140 may include an inorganic insulating material such as a silicon nitride (SiNx), a silicon oxynitride (SiON), or a silicon oxide (SiOx).

A semiconductor layer including a channel semiconductor 154 and a plurality of step-preventing semiconductors 156 is disposed on the gate insulating layer 140. The semiconductor layer may include an amorphous or polycrystalline silicon or an oxide semiconductor material. The channel semiconductor 154 may overlap with the gate electrode 124.

A data conductive layer including a pair of data lines 171a and 171b including a source electrode 173 and a drain electrode 175 is disposed on the gate insulating layer 140 and the semiconductor layer. The data conductive layer may include at least one among metals such as copper (Cu), aluminum (Al), magnesium (Mg), silver (Ag), gold (Au), platinum (Pt), palladium (Pd), nickel (Ni), neodymium (Nd), iridium (Ir), molybdenum (Mo), tungsten (W), titanium (Ti), chromium (Cr), tantalum (Ta), and an alloy.

The data line 171 includes the first data line 171a and the second data line 171b, and extends in the second direction Y crossing the gate line 121. The first data line 171a extends in the second direction DR2 and includes the source electrode 173. The second data line 171b extends in the second direction DR2 and may include the source electrode 173.

The source electrode 173 may be formed of a shape that expands from the data line 171 in the first direction X, and extends with an approximate "U" shape toward the gate electrode 124. The shape of the source electrode 173 is not limited thereto.

The plurality of step-preventing semiconductors 156 are disposed between portions where that the gate conductive layer and the data line 171 are crossed, and may prevent the data line 171 from being disconnected by a step generated due to the gate conductive layer.

The drain electrode 175 is separated from the data line 171 and the source electrode 173. The drain electrode 175 may include a part facing the source electrode 173 in the region overlapping the gate electrode 124, and an expansion part 177. Most of the region between the drain electrode 175 and the source electrode 173 facing each other may overlap the channel semiconductor 154.

The expansion part 177 may overlap with the expansion part 131c of the storage electrode line 131. The expansion part 177 overlaps the expansion part 131c of the storage electrode line 131 via the gate insulating layer 140, thereby forming a storage capacitor Cst. The storage capacitor Cst may have a function of maintaining the voltage applied to the drain electrode 175 and the pixel electrode connected thereto even when the data voltage is not applied to the drain electrode 175 and the pixel electrode 191 from the data lines 171a and 171b.

The gate electrode 124, the source electrode 173, and the drain electrode 175 form a thin film transistor as a switching element along with the channel semiconductor 154, and a channel of the thin film transistor is formed in the channel semiconductor 154 between the source electrode 173 and the drain electrode 175.

A passivation layer 180 is disposed on the data conductive layer and the exposed semiconductor layer. The passivation layer 180 may be the inorganic insulating layer material such as a silicon nitride (SiNx), a silicon oxide (SiOx), etc.

A color filter 230 may be disposed on the passivation layer 180. The color filter 230 may include the inorganic insulating material or the organic insulating material. The color filter 230 may uniquely represent one of primary colors.

The passivation layer 180 and the color filter 230 may include a contact hole 185. The contact hole 185 is disposed on the expansion part 177 of the drain electrode 175, thereby connecting the drain electrode 175 and the pixel electrode 191 through the contact hole 185.

A pixel electrode layer including the pixel electrode 191 and a shielding electrode 199 may be disposed on the passivation layer 180 and the color filter 230. The pixel electrode layer may include a transparent conductive material such as an ITO (indium tin oxide), an IZO (indium zinc oxide), etc., or the metal of aluminum (Al), silver (Ag), chromium (Cr), and alloys thereof.

Referring to FIG. 16, the overall shape of the pixel electrode 191 is approximately quadrangular, and may include a pattern where the pixel electrode 191 is partially removed. According to the removed pattern, the pixel electrode 191 may include a transverse stem part 192, a longitudinal stem part 193, a plurality of minute branch parts 194, a connection part 196, and an expansion part 197.

The transverse stem part 192 extends in the first direction X, and the longitudinal stem part 193 is connected to the transverse stem part 192 in a cross shape and approximately extends in the second direction Y.

The pixel electrode 191 may be divided into four sub-regions R1, R2, R3, and R4 by the transverse stem part 192 and the longitudinal stem part 193.

The plurality of minute branch parts 194 are disposed in four sub-regions R1, R2, R3, and R4, and obliquely extend from the transverse stem part 192 and the longitudinal stem part 193 in a diagonal direction from the first direction X and the second direction Y. The minute branch parts 194 of two sub-regions R1 and R2, and R3 and R4, facing each other via the longitudinal stem part 193, extend in different directions from each other.

The electrode is removed between the adjacent minute branch parts 194, and hereinafter this is referred to as a minute slit.

An acute angle formed between the minute branch parts 194 and the transverse stem part 192 or the longitudinal stem part 193 may be about 40° to 45°, but it is not limited thereto, and may be appropriately adjusted in consideration of display characteristics such as visibility and the like of the liquid crystal display.

The connection part 196 may be connected to the minute branch parts 194 of the sub-region R3. The expansion part 197 may be connected to the minute branch parts 194 of the sub-region R3 through the connection part 196, and may overlap the expansion part 177 of the drain electrode 175.

The expansion part 196 of the pixel electrode 191 is electrically connected to the drain electrode 175 through the contact hole 185, thereby receiving the data voltage.

As shown in FIG. 16, the ends of the left and right edges of the pixel electrode 191 may overlap the longitudinal part 131b of the storage electrode line 131. According to an embodiment, the right/left ends of the pixel electrode 191 may not overlap the longitudinal part 131b.

The shielding electrode 199 is separated from the pixel electrode 191, may substantially extend in the first direction X, and may be disposed in the region overlapping part of the plurality of gate lines 121a and 121b. The shielding electrode 199 may overlap the gate line 121, and may be disposed in the second direction Y to overlap part of the second data line 171b.

The shielding electrode 199 receives the same voltage as a common electrode 270. No electric field is generated between the shielding electrode 199 and the common electrode 270 to change orientations of liquid crystal molecules 31 interposed between the shielding electrode 199 and the common electrode 270. The liquid crystal between the shielding electrode 199 and the common electrode 270 displays black. As above-described, when the liquid crystal molecules display the black, liquid crystal molecules themselves may function as a light blocking member.

Next, the second substrate 210 facing the first substrate 110 and disposed upward is mainly described.

A light blocking member 220 may be disposed under the second substrate 210. The light blocking member 220 may prevent light leakage between adjacent pixel electrodes 191. Particularly, the light blocking member 220 may be mainly disposed at the region between the adjacent pixel electrodes 191. The light blocking member 220 may include an opening (not shown) transmitting light.

The common electrode 270 is disposed under the second substrate 210 and the light blocking member 220. The common electrode 270 may be continuously formed in most of the region corresponding to the display area DA. The common electrode 270 may also include a transparent conductive material such as an ITO (indium tin oxide), an IZO (indium zinc oxide), etc., or the metal of aluminum (Al), silver (Ag), chromium (Cr), and alloys thereof, like the pixel electrode layer. The common electrode 270 may not be patterned to include the slit, etc., or a slit or a cutout may be included if necessary.

The color filter 230 disposed on the first substrate 110 may be alternatively disposed between the second substrate 210 and the common electrode 270.

The liquid crystal layer 3 is disposed between the first substrate 110 and the second substrate 210.

The liquid crystal layer 3 may include liquid crystal molecules 31 having negative dielectric anisotropy. The liquid crystal molecules 31 may be aligned so that long axes thereof are oriented at a predetermined angle or are perpendicular to the surface of the first and second substrates 110 and 210 when an electric field is not applied to the liquid crystal layer 3. The liquid crystal molecules 31 may be pretilted along the fringe field or the step between the edges of the patterned portions (e.g., the minute branch parts 194) of the pixel electrode 191 and the common electrode 270.

An alignment layer 11 covering the pixel electrode 191 and the color filter 230 may be disposed on the first substrate 110, and an alignment layer 21 may be disposed under the common electrode 270 on the second substrate 210. The two alignment layers 11 and 21 may be vertical alignment layers. A plurality of polymer protrusions formed by reacting a reactive monomer (RM) with light such as ultraviolet rays may be positioned at the surface of the alignment layers 11 and 21 adjacent to the liquid crystal layer 3, and these polymer protrusions may function to maintain the pretilt of the liquid crystal molecules 31 of the liquid crystal layer 3.

As the pixel electrode 191 to which the data voltage is applied generates the electric field along with the common electrode 270 of the second substrate 20, an arrangement direction of the liquid crystal molecules 31 of the liquid crystal layer 3 disposed between the two electrodes 191 and 270 is determined. Depending on the directions of the liquid crystal molecules determined as such, luminance of light passing through the liquid crystal layer 3 is controlled.

As described in the display device shown in FIG. 15 to FIG. 17, the first data line 171a (i.e., the first data line) and the second data line 171b (i.e., the second data line) may overlap the pixel electrode 191. In this case, the first parasitic capacitor may be formed between the pixel electrode 191 and the first data line, the second parasitic capacitor may be formed between the pixel electrode 191 and the second data line, and the deviation of the pixel voltage may occur by the first parasitic capacitor and the second parasitic capacitor.

As described with reference to FIG. 1 to FIG. 12, the data voltage compensating the parasitic capacitance between the pixel electrode 191 and the adjacent data lines 171a and 171b may be applied to the pixel PX using the panel sensor 110, thereby preventing display quality deterioration potentially caused by vertical crosstalk.

Figure 18:
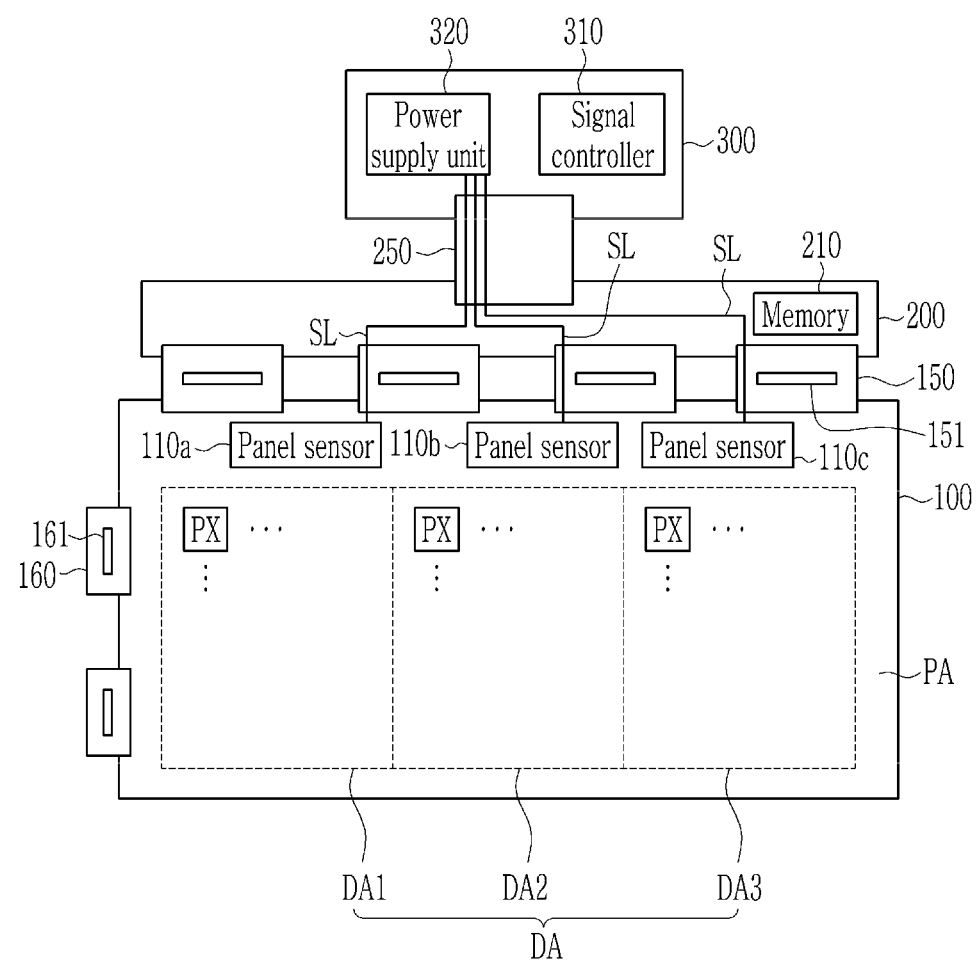
FIG. 18 is a block diagram schematically showing a display device according to an embodiment.

FIG. 18 is a block diagram schematically showing a display device according to another embodiment.

Referring to FIG. 18, the display area DA may be divided into a plurality of display areas DA1, DA2, and DA3. For example, the display area DA may include a first display area DA1, a second display area DA2, and a third display area DA3. Each of the first display area DA1, the second display area DA2, and the third display area DA3 may include a plurality of pixels PX, a plurality of gate lines, and a plurality of data lines.

In the manufacturing process of the display device, the plurality of data lines included in the first display area DA1, the plurality of data lines included in the second display area DA2, and the plurality of data lines included in the third display area DA3 are patterned using different masks. The pixel electrodes of the plurality of pixels PX included in the first display area DA1, the pixel electrodes of the plurality of pixels PX included in the second display area DA2, and the pixel electrodes of the plurality of pixels PX included in the third display area DA3 are patterned using different masks.

The peripheral area PA may include a first panel sensor 110a corresponding to the first display area DA1, a second panel sensor 110b corresponding to the second display area DA2, and a third panel sensor 110c corresponding to the third display area DA3. When forming the plurality of data lines and pixel electrodes included in the first display area DA1, the first panel sensor 110a may also be formed. When forming the plurality of data lines and pixel electrodes included in the second display area DA2, the second panel sensor 110b may also be formed. When forming the plurality of data lines and pixel electrodes included in the third display area DA3, the third panel sensor 110c may also be formed.

Each of the first panel sensor 110a, the second panel sensor 110b, and the third panel sensor 110c may have the structures shown in FIG. 3 and FIG. 4 or the structures illustrated in FIG. 9 and FIG. 10.

The power supply unit 320 may store the first parasitic capacitance (according to the alignment error of a pixel electrode and a data line included in the first display area DA1 obtained through the first panel sensor 110a) to the memory 210, may store the second parasitic capacitance (according to the alignment error of a pixel electrode and a data line included in the second display area DA2 obtained through the second panel sensor 110b) to the memory 210, and may store the third parasitic capacitance (according to the alignment error of a pixel electrode and a data line included in the third display area DA3 obtained through the third panel sensor 110c) to the memory 210.

The signal controller 310 reads the values of the parasitic capacitances stored in the memory 210, and compensates the parasitic capacitance values by the method described with reference to FIG. 5 to FIG. 8 or the method described with reference to FIG. 11 and FIG. 12 for the first display area DA1, the second display area DA2, and the third display area DA3 so as to prevent or minimize vertical crosstalk.

The described embodiments are illustrative and are not limiting. Various modifications can be made in the described embodiments. The scope of practical embodiments should be defined by the appended claims.

What is claimed is:

1. A display device comprising:
a first insulating layer;
a second insulating layer overlapping the first insulating layer;
a pixel electrode disposed directly on a face of the second insulating layer;
a first data line disposed directly on a face of the first insulating layer and electrically connected to the pixel electrode;
a second data line disposed directly on the face of the first insulating layer and disposed adjacent to the pixel electrode without being electrically connected to the pixel electrode;
a first sensing electrode disposed directly on the face of the second insulating layer;
a second sensing electrode disposed on the face of the second insulating layer and separated from the first sensing electrode by a predetermined distance; and
a third sensing electrode disposed directly on the face of the first insulating layer, partially overlapping the first sensing electrode to form a first sensing capacitor, and partially overlapping the second sensing electrode to form a second sensing capacitor.

2. The display device of claim 1, wherein
the first sensing electrode includes a first connection portion extending in a first direction and a first extending portion extending from the first connection portion in a second direction,
the second sensing electrode includes a second connection portion extending in the first direction and a second extending portion extending from the second connection portion in the second direction,
the third sensing electrode includes a third connection portion extending in the first direction and a third extending portion extending from the third connection portion in the second direction, and
the third extending portion overlaps a part of the first extending portion and a part of the second extending portion.

3. The display device of claim 1, wherein
a capacitance of the second sensing capacitor corresponds to a capacitance of a first parasitic capacitor formed between the pixel electrode and the first data line, and
a capacitance of the first sensing capacitor corresponds to a capacitance of a second parasitic capacitor formed between the pixel electrode and the second data line.

4. The display device of claim 1, wherein
when a first reference voltage is applied to the first sensing electrode and when a second reference voltage is applied to the second sensing electrode, a voltage between the first reference voltage and the second reference voltage is formed at the third sensing electrode.

5. The display device of claim 4, further comprising
a power supply unit receiving the voltage formed at the third sensing electrode as a measuring voltage, measuring a capacitance of a first parasitic capacitor formed between the pixel electrode and the first data line using the measuring voltage, and measuring a capacitance of a second parasitic capacitor formed between the pixel electrode and the second data line.

6. The display device of claim 5, further comprising
a memory storing the capacitance of the first parasitic capacitor and the second parasitic capacitor.

7. The display device of claim 6, further comprising
a signal controller generating an image data signal by correcting an image signal when the capacitance of the first parasitic capacitor is larger than the capacitance of the second parasitic capacitor, wherein
a magnitude of a data voltage associated with the image data signal is less than a magnitude of a data voltage associated with the image signal, and
the data voltage according to the image data signal is provided to the pixel electrode.

8. The display device of claim 6, further comprising
a signal controller generating an image data signal by correcting an image signal when the capacitance of the second parasitic capacitor is larger than the capacitance of the first parasitic capacitor, wherein
a magnitude of a data voltage associated with the image data signal is greater than a magnitude of a data voltage associated with the image signal, and
the data voltage according to the image data signal is provided to the pixel electrode.

9. The display device of claim 1, further comprising
a signal controller generating an image data signal by correcting an image signal when the capacitance of the second sensing capacitor is larger than the capacitance of the first sensing capacitor, wherein
a magnitude of a data voltage associated with the image data signal is less than a magnitude of a data voltage associated with the image signal, and
the data voltage according to the image data signal is provided to the pixel electrode.

10. The display device of claim 1, further comprising
a signal controller generating an image data signal by correcting an image signal when the capacitance of the first sensing capacitor is larger than the capacitance of the second sensing capacitor, wherein
a magnitude of a data voltage associated with the image data signal is greater than a magnitude of a data voltage associated with the image signal, and
the data voltage according to the image data signal is provided to the pixel electrode.

* * * * *